United States Patent
Alshina et al.

(10) Patent No.: US 9,407,928 B2
(45) Date of Patent: *Aug. 2, 2016

(54) METHOD FOR IMAGE INTERPOLATION USING ASYMMETRIC INTERPOLATION FILTER AND APPARATUS THEREFOR

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/644,684

(22) Filed: Mar. 11, 2015

(65) Prior Publication Data

US 2015/0189317 A1    Jul. 2, 2015

Related U.S. Application Data

(63) Continuation of application No. 14/130,157, filed as application No. PCT/KR2012/005135 on Jun. 28, 2012.

(60) Provisional application No. 61/502,056, filed on Jun. 28, 2011.

(51) Int. Cl.
H04N 19/00    (2014.01)
H04N 19/523    (2014.01)
(Continued)

(52) U.S. Cl.
CPC ............ *H04N 19/523* (2014.11); *G06T 3/4007* (2013.01); *H04N 19/117* (2014.11);
(Continued)

(58) Field of Classification Search
CPC . H04N 7/50; H04N 7/26244; H04N 7/26085; H04N 7/26079; H04N 7/26271
See application file for complete search history.

(56) References Cited

U.S. PATENT DOCUMENTS 6,714,593 B1    3/2004  Benzler et al.
7,944,969 B2    5/2011  Yan
(Continued)

FOREIGN PATENT DOCUMENTS

JP    2008-252944 A    10/2008
KR    10-2010-0074137 A    7/2010
(Continued)

OTHER PUBLICATIONS

Karczewicz et al. "A Hybrid Video Coder Based on Extended Macroblock Sizes, Improved Interpolation, and Flexible Motion Representation," Circuits and Systems for Video Technology, IEEE Transactions on , vol. 20, No. 12, pp. 1698,1708, Dec. 2010.*
(Continued)

Primary Examiner — Jay Patel
Assistant Examiner — Frank Huang
(74) Attorney, Agent, or Firm — Sughrue Mion, PLLC

(57) ABSTRACT

A sub-pel-unit image interpolation method using a transformation-based interpolation filter includes, selecting, based on a sub-pel-unit interpolation location in a region supported by a plurality of interpolation filters for generating at least one sub-pel-unit pixel value located between integer-pel-unit pixels, one of a symmetric interpolation filter and an asymmetric interpolation filter from among the plurality of interpolation filters; and using the selected interpolation filter to generate the at least one sub-pel-unit pixel value by interpolating the integer-pel-unit pixels.

3 Claims, 27 Drawing Sheets

(51) Int. Cl.
*G06T 3/40* (2006.01)
*H04N 19/61* (2014.01)
*H04N 19/117* (2014.01)
*H04N 19/182* (2014.01)
*H04N 19/167* (2014.01)
*H04N 19/59* (2014.01)
*H04N 19/537* (2014.01)
*H04N 19/52* (2014.01)
*H04N 19/82* (2014.01)

(52) U.S. Cl.
CPC ........... *H04N19/167* (2014.11); *H04N 19/182* (2014.11); *H04N 19/52* (2014.11); *H04N 19/537* (2014.11); *H04N 19/59* (2014.11); *H04N 19/61* (2014.11); *H04N 19/82* (2014.11)

(56) References Cited

U.S. PATENT DOCUMENTS

| | | | | |
|---|---|---|---|---|
| 8,320,460 | B2* | 11/2012 | Yan | 375/240.21 |
| 8,462,842 | B2 | 6/2013 | Ye et al. | |
| 8,982,957 | B2* | 3/2015 | Oh et al. | 375/240.16 |
| 2003/0112864 | A1 | 6/2003 | Karczewicz et al. | |
| 2008/0069239 | A1 | 3/2008 | Yan | |
| 2008/0075165 | A1 | 3/2008 | Ugur et al. | |
| 2008/0165857 | A1 | 7/2008 | Yan | |
| 2009/0022412 | A1 | 1/2009 | Okada | |
| 2009/0257493 | A1 | 10/2009 | Ye et al. | |
| 2010/0220788 | A1 | 9/2010 | Wittmann et al. | |
| 2013/0094582 | A1 | 4/2013 | Wittmann et al. | |

FOREIGN PATENT DOCUMENTS

| | | |
|---|---|---|
| KR | 10-2011-0004430 A | 1/2011 |
| KR | 10-2011-0005845 A | 1/2011 |
| RU | 2317654 C2 | 6/2005 |
| TW | 201028015 A1 | 7/2010 |
| WO | 2009126936 A1 | 10/2009 |

OTHER PUBLICATIONS

International Search Report (PCT/ISA/210), dated Jan. 14, 2013, issued by the International Searching Authority in counterpart International Patent Application No. PCT/KR2012/005135.

Alshina at al., "Experimental results of 4 taps/5 bits Chroma DCTIF in HM2.0", Joint Collaborative Team on Video Coding (JCT-VC) of ITU-T SG16 WP3 and ISO/IEC JTC1/SC29/WG11, JCTVC-E426, Mar. 2011, 4 pages total.

Alshina et al., "CE3: 7 taps interpolation filters for quarter pel position MC from Samsung and Motorola Mobility", Joint Collaborative Team on Video Coding (JCT-VC) of ITU-T SG16 WP3 and ISO/IEC JTC1/SC29/WG11, JCTVC-G778, Nov. 2011, 9 pages total.

Alshina et al., "CE3: DCT Derived interpolation filter test by Samsung", Joint Collaborative Team on Video Coding (JCT-VC) of ITU-T SG16 WP3 and ISO/IEC JTC1/SC29/WG11, JCTVC-F247, Jul. 2011, 10 pages total.

Alshina, et al., "CE3: Experimental results of DCTIF by Samsung", Joint Collaborative Team on Video Coding (JCT-VC) of ITU-T SG16 WP3 and ISO/IEC JTC1/SC29/WG11, JCTVC-D344, Jan. 11, 15 pages total.

Chen et al., "CE4: Experimental results of DCTIF application for Chroma MC by Samsung", Joint Collaborative Team on Video Coding (JCT-VC) of ITU-T SG16 WP3 and ISO/IEC JTC1/SC29/WG11, JCTVC-D347, Jan. 2011, 6 pages total.

Communication issued by the European Patent Office dated Feb. 3, 2015 in counterpart European Patent Application No. 14194900.8.

Communication issued by the European Patent Office dated Jan. 27, 2015 in counterpart European Patent Application No. 12804597.8.

Communication issued by the Japan Patent Office dated Dec. 9, 2014 in counterpart Japanese Patent Application No. 2014-518802.

Communication issued by the Mexican Patent Office dated Feb. 6, 2015 in counterpart Mexican Patent Application No. MX/a/2014/000056.

Kondo et al., Memory bandwidth reduction MC filter, Joint Collaborative Team on Video Coding (JCT-VC) of ITU-T SG16 WP3 and ISO/IEC JTC1/SC29/WG11, JCTVC-E129, Mar. 2011, 13 pages total.

Lou et al., "CE3: Report on Motorola Mobility's interpolation filter for HEVC", Joint Collaborative Team on Video Coding (JCT-VC) of ITU-T SG16 WP3 and ISE/IEC JTC1/SC29/WG11, JCTVC-E358, Mar. 2011, 4 pages total.

McCann et al., "HM3: High Efficiency Video Coding (HEVC) test Model 3 Encoder Description", Joint Collaborative Team on Video Coding (JCT-VC) of ITU-T SG16 WP3 and ISO/IEC JTC1/SC29/WG11, JCTVC-E602, Mar. 2011, 34 pages total.

McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, JCTVC-A124, Apr. 2010, 42 pages total.

Wiegand et al., "WD3: Working Draft 3 of High-Efficiency Video Coding", Joint Collaborative Team on Video Coding (JCT-VC) of ITU-T SG16 WP3 and ISE/IEC JTC1/SC29/WG11, JCTVC-E603, Mar. 2011, 11 pages total.

Communication dated Apr. 22, 2015 issued by the Mexican Patent Office in counterpart Mexican patent Application No. MX/a/2014/000056.

Communication dated Sep. 28, 2015 issued by the Russian Patent Office in counterpart Russian Patent Application No. 2014102579.

Communication issued on Dec. 23, 2015 by the European Patent Office in related Application No. 12804597.8.

Communication issued on Feb. 22, 2016 by the Korean Intellectual Property Office in related Application No. 10-2014-0115700.

Communication issued on Feb. 22, 2016 by the Korean Intellectual Property Office in related Application No. 10-2014-0148733.

Communication issued on Feb. 22, 2016 by the Korean intellectual Property Office in related Application No. 10-2015-0034051.

Communication issued on Feb. 22, 2016 by the Korean Intellectual Property Office in related Application No. 10-2015-0034052.

McCann et al., "High Efficiency Video Coding (HEVC) Test Model 2 (HM 2) Encoder Description", Joint Collaborative Team on Video Coding *JCT-VC) of ITU-T SG16 WP3 and ISO/IEX JTC1/SC29/WG11, 3rd Meeting, Oct. 7-15, 2010, Document: JCTVC-D502, 28 total pages, Apr. 15, 2011 (date as listed in Cite No. 1 and date uploaded to URL listed in Cite No. 1).

Communication from the Russian Patent Office dated Mar. 25, 2016 in a counterpart Russian application No. 2014102579/07.

Communication issued on Apr. 22, 2016 by the Taiwanese Patent Office in related Application No. 101123314.

\* cited by examiner

FIG. 9A

| Frac MV | Filter coefficients for reference pixels $\{P_{-1}, P_0, P_1\}$ | α | N |
|---|---|---|---|
| 1/8 | {-3,63,4}; | 1/10 | no |
| 1/8 | {-2,63,3} | 1/10 | 6 |
| 1/8 | {-1,62,3};{-1,63,2} | 1/10 | 4 |
| 1/8 | {-2,62,4}; | 0.117 | 5 |
| 1/8 | {-5,63,6};{-4,62,6};{-4,63,5} | 0.125 | no |
| 1/8 | {-3,62,5} | 0.125 | 6 |
| 1/8 | {-2,62,4};{-3,63,4} | 0.125 | 5 |
| 1/8 | {-2,63,3};{-1,62,3}; | 0.125 | 4 |
| 1/4 | {-7,59,12};{-6,58,12};{-7,58,13} | 0.25 | no |
| 1/4 | {-5,58,11}; | 0.25 | 6 |
| 1/4 | {-4,57,11};{-4,58,10};{-3,57,10}; | 0.25 | 5 |
| 1/4 | {-1,56,9};{-2,57,9};{-2,56,10}; | 0.25 | 4 |
| 3/8 | {-8,52,20}; | 0.375 | no |
| 3/8 | {-7,51,20};{-6,50,20};{-6,51,19} | 0.375 | 8 |
| 3/8 | {-5,50,19} | 0.375 | 7 |
| 3/8 | {-3,49,18};{-4,50,18};{-4,49,19} | 0.375 | 5 |
| 3/8 | {-8,51,21} | 0.383 | no |
| 3/8 | {-8,50,22} | 0.4 | no |
| 3/8 | {-7,49,22} | 0.4 | 10 |
| 3/8 | {-6,49,21} | 0.4 | 8 |
| 3/8 | {-5,48,21} | 0.4 | 6 |
| 3/8 | {-4,47,21};{-4,48,20};{-3,47,20}; | 0.4 | 5 |
| 3/8 | {-2,47,19}; | 0.4 | 4.5 |
| 1/2 | {-8,43,29}; | 0.5 | no |
| 1/2 | {-7,42,29}; | 0.5 | 10 |
| 1/2 | {-5,42,29};{-6,41,29};{-6,42,28}; | 0.5 | 9 |
| 1/2 | {-5,41,28} | 0.5 | 6 |

FIG. 9B

| Frac MV | Filter coefficients for reference pixels {P-1, P0, P1, P2} | α | N |
|---|---|---|---|
| 1/8 | {-3,62,7,-2} | 0.1 | no |
| 1/8 | {-3,62,6,-1} | 0.1 | 6 |
| 1/8 | {-2,61,6,-1};{-2,62,5,-1};{-2,62,6,-2}; | 0.1 | 4 |
| 1/8 | {-3,61,8,-2};{-4,62,8,-2};{-4,61,9,-2}; {-4,61,8,-1} | 0.017 | no |
| 1/8 | {-3,61,7,-1}; | 0.017 | 10 |
| 1/8 | {-4,61,8,-1};{-3,60,8,-1};{-3,61,7,-1}; {-3,61,8,-2}; | 0.125 | 9 |
| 1/4 | {-5,58,14,-3}; | 0.2 | no |
| 1/4 | {-5,58,13,-2};{-4,57,13,-2};{-4,58,12,-2}; {-4,58,13,-3}; | 0.2 | 8 |
| 1/4 | {-5,58,12,-1};{-4,57,12,-1};{-4,58,11,-1}; | 0.2 | 6 |
| 1/4 | {-5,56,15,-2};{-4,55,15,-2};{-4,56,14,-2}; {-4,56,15,-3}; | 0.23 | 6 |
| 1/4 | {-6,56,18,-4} | 0.25 | no |
| 1/4 | {-6,56,17,-3};{-5,55,17,-3};{-5,56,16,-3}; {-5,56,17,-4} | 0.25 | 10 |
| 1/4 | {-5,55,16,-2};{-4,54,16,-2};{-4,55,15,-2}; {-4,55,16,-3}; | 0.25 | 7 |
| 1/4 | {-4,54,17,-2} | 0.26 | 6 |
| 3/8 | {-6,48,28,-6};{-7,49,28,-6}; {-7,48,29,-6}{-7,48,28,-5} | 0.375 | no |
| 3/8 | {-6,47,28,-5};{-6,48,27,-5}; | 0.375 | 10 |
| 3/8 | {-6,47,28,-5};{-6,48,27,-5}; | 0.375 | 9 |
| 3/8 | {-6,47,27,-4};{-5,46,27,-4};{-5,47,26,-4}; | 0.375 | 7 |
| 3/8 | {-7,48,29,-6};{-7,47,30,-6};{-7,47,29,-5}; | 0.385 | no |
| 1/2 | {-7,39,39,-7} | 0.5 | no |
| 1/2 | {-6,38,38,-6} | 0.5 | 11 |
| 1/2 | {-5,37,37,-5} | 0.5 | 7 |
| 1/2 | {-4,36,36,-4}; | 0.5 | 5.7 |

FIG. 9C

| Frac MV | Filter coefficients for reference pixels $\{P_{-1}, P_0, P_1, P_2, P_3\}$ | α | N |
|---|---|---|---|
| 1/4 | {3,-9,60,13,-3};{2,-8,60,13,-3}; {2,-9,61,13,-3};{2,-9,60,14,-3}; {2,-9,60,13,-2}; | 0.2 | no |
| 1/4 | {1,-8,60,13,-2};{2,-9,60,13,-2}; {2,-8,59,13,-2};{2,-8,60,12,-2}; {2,-8,60,13,-3}; | 0.2 | 10 |
| 1/4 | {1,-7,60,12,-2}; | 0.2 | 8 |
| 1/4 | {3,-10,58,17,-4}; | 0.25 | no |
| 1/4 | {1,-8,57,16,-2}; | 0.25 | 8 |
| 1/2 | {4,-12,41,37,-6};{3,-11,41,37,-6}; {3,-12,42,37,-6};{3,-12,41,38,-6}; {3,-12,41,37,-5}; | 0.5 | no |
| 1/2 | {3,-11,41,37,-6};{2,-10,41,37,-6}; {2,-11,42,37,-6};{2,-11,41,38,-6}; {2,-11,41,37,-5}; | 0.5 | 12 |
| 1/2 | {1,-10,41,37,-5};{2,-11,41,37,-5}; {2,-10,40,37,-5};{2,-10,41,36,-5}; {2,-10,41,37,-6}; | 0.5 | 10 |
| 1/2 | {2,-9,40,36,-5};{1,-8,40,36,-5}; {1,-9,41,36,-5};{1,-9,40,37,-5}; {1,-9,40,36,-4}; | 0.5 | 8 |
| 1/2 | {1,-9,40,36,-4};{1,-8,39,36,-4}; {1,-8,40,35,-4};{1,-8,40,36,-5}; | 0.5 | 8 |

FIG. 9D

| Frac MV | Filter coefficients for reference pixels $\{P_{-2}, P_{-1}, P_0, P_1, P_2, P_3\}$ | α | N |
|---|---|---|---|
| 1/4 | {2,-8,59,15,-5,1} | 0.2 | no |
| 1/4 | {3,-8,59,14,-5,1};{2,-7,59,14,-5,1}; {2,-8,60,14,-5,1};{2,-8,59,14,-4,1}; {2,-8,59,14,-5,2}; | 0.2 | 13 |
| 1/4 | {1,-7,59,14,-4,1}; | 0.2 | 10 |
| 1/4 | {1,-9,57,19,-6,2};{2,-10,57,19,-6,2}; {2,-9,58,19,-6,2};{2,-9,57,18,-6,2}; {2,-9,57,19,-7,2};{2,-9,57,19,-6,1}; | 0.25 | no |
| 1/4 | {3,-9,57,18,-6,1};{2,-10,57,18,-6,1}; {2,-9,58,18,-6,1};{2,-9,57,19,-6,1}; {2,-9,57,18,-5,1};{2,-9,57,18,-6,2}; | 0.25 | 13 |
| 1/4 | {3,-9,57,18,-6,1};{2,-8,57,18,-6,1}; {2,-9,58,18,-6,1};{2,-9,57,19,-6,1}; {2,-9,57,18,-5,1};{2,-9,57,18,-6,2}; | 0.25 | 12 |
| 1/4 | {1,-8,57,18,-5,1};{2,-9,57,18,-5,1}; {2,-8,56,18,-5,1};{2,-8,57,17,-5,1}; {2,-8,57,18,-6,1}; | 0.25 | 10 |
| 1/4 | {1,-7,56,18,-5,1};{1,-8,57,18,-5,1}; {1,-6,56,19,-5,1};{1,-8,56,18,-4,1}; | 0.25 | 8 |
| 1/2 | {3,-11,40,40,-11,3} | 0.5 | no |
| 1/2 | {2,-10,40,40,-10,2} | 0.5 | 14 |
| 1/2 | {2,-9,39,39,-9,2};{3,-10,39,39,-10,3} | 0.5 | 13 |
| 1/2 | {1,-8,39,39,-8,1}; | 0.5 | 8 |
| 1/2 | {1,-7,38,38,-7,1};{2,-8,38,38,-8,2}; | 0.5 | 7 |

FIG. 10A

| Frac MV | Filter coefficients for reference pixels $\{P_{-3}, P_{-2}, P_{-1}, P_0, P_1, P_2, P_3\}$ | α | N |
|---|---|---|---|
| 1/4 | {-1,4,-9,60,14,-5,1}; | 0.2 | no |
| 1/4 | {-1,3,-9,60,14,-4,1}; | 0.2 | 14 |
| 1/4 | {-1,2,-8,60,14,-4,1};{-1,3,-8,59,14,-4,1}; {-1,3,-8,60,13,-4,1};{-1,3,-8,60,14,-5,1}; | 0.2 | 10.1 |
| 1/4 | {-1,4,-11,58,18,-6,2};{-2,5,-11,58,18,-6,2}; {-1,5,-12,58,18,-6,2};{-1,5,-11,57,18,-6,2}; {-1,5,-11,58,17,-6,2};{-1,5,-11,58,18,-7,2}; {-1,5,-11,58,18,-6,1}; | 0.25 | no |
| 1/4 | {-1,4,-10,58,18,-6,1}; | 0.25 | 15 |
| 1/4 | {-1,4,-10,58,17,-5,1}; {-2,4,-10,58,18,-5,1}; {-1,3,-10,58,18,-5,1};{-1,4,-11,58,18,-5,1}; {-1,4,-10,57,18,-5,1}; {-1,4,-10,58,18,-6,1}; | 0.25 | 14 |
| 1/4 | {-1,3,-10,58,18,-5,1}; | 0.25 | 11 |
| 1/4 | {-1,4,-10,58,17,-5,1};{-1,3,-9,58,17,-5,1}; {-1,3,-10,59,17,-5,1};{-1,3,-10,58,18,-5,1}; {-1,3,-10,58,17,-4,1}; | 0.25 | 10 |
| 1/2 | {-2,6,-13,41,39,-10,3}; | 0.5 | no |
| 1/2 | {-2,6,-12,41,39,-10,2};{-3,6,-12,41,39,-10,3}; {-2,5,-12,41,39,-10,3};{-2,6,-12,40,39,-10,3}; {-2,6,-12,41,38,-10,3};{-2,6,-12,41,39,-11,3}; | 0.5 | 36 |
| 1/2 | {-2,5,-12,41,39,-10,3}; | 0.5 | 32 |
| 1/2 | {-2,5,-12,41,39,-10,3};{-1,4,-12,41,39,-10,3}; {-1,5,-13,41,39,-10,3};{-1,5,-12,40,39,-10,3}; {-1,5,-12,41,38,-10,3};{-1,5,-12,41,39,-11,3}; | 0.5 | 23 |
| 1/2 | {-1,5,-12,41,39,-10,2}; | 0.5 | 20 |
| 1/2 | {-1,5,-12,40,39,-9,2 },{-2,5,-12,41,39,-9,2 }, {-1,4,-12,41,39,-9,2 },{-1,5,-13,41,39,-9,2 }, {-1,5,-12,41,38,-10,2 },{-1,5,-12,41,39,-9,1 }, | 0.5 | 13 |
| 1/2 | {-2,5,-11,40,39,-9,2 },{-1,5,-11,40,39,-9,1 }, {-1,5,-11,40,39,-10,2 }, | 0.5 | (17)-(19) β=0.12, l=1 |

FIG. 10B

| Frac MV | Filter coefficients for reference pixels $\{P_{-2}, P_{-1}, P_0, P_1, P_2, P_3, P_4\}$ | α | N |
|---|---|---|---|
| 1/4 | {2, -9, 56, 20, -8, 4, -1} | -0.75 | no |
| 1/2 | {3, -10, 39, 41, -13, 6, -2} | -0.5 | no |
| 3/4 | {2, -6, 18, 58, -11, 4, -1} | -0.25 | no |

FIG. 10C

| Frac MV | Filter coefficients for reference pixels $\{P_{-1}, P_0, P_1, P_2, P_3, P_4, P_5\}$ | α | N |
|---|---|---|---|
| 1/4 | {-5, 54, 21, -9, 5, -3, 1} | -1.75 | no |
| 1/2 | {-6, 36, 44, -15, 8, -4, 1} | -1.5 | no |
| 3/4 | {-3, 16, 59, -12, 6, -3, 1} | -1.25 | no |

FIG. 11A

| Frac MV | Filter coefficients for reference pixels $\{P_{-3}, P_{-2}, P_{-1}, P_0, P_1, P_2, P_3, P_4\}$ | α | N |
|---|---|---|---|
| 1/4 | {-1,3,-8,60,14,-6,3,-1};{-2,3,-8,60,14,-5,3,-1}; {-1,2,-8,60,14,-5,3,-1};{-1,3,-9,60,14,-5,3,-1}; {-1,3,-8,59,14,-5,3,-1};{-1,3,-8,60,13,-5,3,-1}; {-1,3,-8,60,14,-5,2,-1} | 0.185 | no |
| 1/4 | {-1,4,-9,59,15,-6,3,-1} | 0.2 | no |
| 1/4 | {-1,4,-10,57,19,-7,3,-1};{-1,4,-11,57, 20,-7,3,-1};{-1,4,-9,57, 18,-7,3,-1} | 0.25 | no |
| 1/2 | {-2,5,-12,41,41,-12,5,-2} | 0.5 | no |
| 1/2 | {-1,5,-12,40,40,-12,5,-1} | 0.5 | 15 |
| 1/2 | {-1,4,-11,40,40,-11,4,-1} | 0.5 | 14 |
| 1/2 | {-1,3,-10,40,40,-10,3,-1} | 0.5 | 10 |
| 1/2 | {1,4,-10,39,39,-10,4,-1} | 0.5 | 10.3 |
| 1/2 | {-1,3,-9,39,39,-9,3,-1}; | 0.5 | (17)-(19) β=0.032, i=1 |

FIG. 11B

| Frac MV | Filter coefficients for reference pixels $\{P_{-2}, P_{-1}, P_0, P_1, P_2, P_3, P_4\}$ | α | N |
|---|---|---|---|
| 1/4 | {2,-9,56,20,-8,4,-2,1} | -0.75 | no |
| 1/2 | {3,-10,39,42,-14,7,-4,1} | -0.5 | no |
| 3/4 | {2,-6,18,58,-11,5,-3,1} | -0.25 | no |

FIG. 11C

| Frac MV | Filter coefficients for reference pixels $\{P_{-4}, P_{-3}, P_{-2}, P_{-1}, P_0, P_1, P_2, P_3\}$ | α | N |
|---|---|---|---|
| 1/4 | {1,-3,5,-11,58,18,-6,2} | 1.25 | no |
| 1/2 | {1,-4,7,-14,42,39,-10,3} | 1.5 | no |
| 3/4 | {1,-2,4,-8,20,56,-9,2} | 1.75 | no |

FIG. 12A
| α | filter₁(α) | N |
|---|---|---|
| 1/4 | {-1, 4, -10, 58, 17, -5, 1} | 8.7 |
| 1/2 | {-1, 4, -11, 40, 40, -11, 4, -1} | 9.5 |
FIG. 12B
| α | filter₁(α) | σ |
|---|---|---|
| 1/8 | {-2, 58, 10, -2} | 0.012 |
| 1/4 | {-4, 54, 16, -2} | 0.016 |
| 3/8 | {-6, 46, 28, -4} | 0.018 |
| 1/2 | {-4, 36, 36, -4} | 0.020 |
FIG. 13A
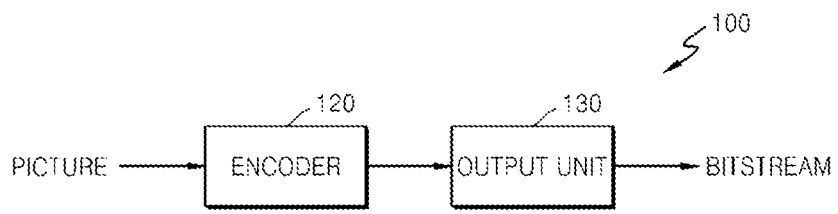
FIG. 13B
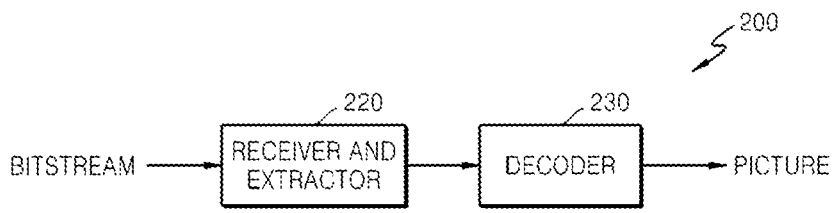

METHOD FOR IMAGE INTERPOLATION USING ASYMMETRIC INTERPOLATION FILTER AND APPARATUS THEREFOR

CROSS REFERENCE TO RELATED APPLICATIONS

This application is a continuation of U.S. application Ser. No. 14/130,157 filed on Jan. 14, 2014, which is a national stage entry of International Application No. PCT/KR2012/005135, filed on Jun. 28, 2012, and which claims the benefit of U.S. Provisional Application No. 61/502,056, filed on Jun. 28, 2011, in the U.S. Patent and Trademark Office the disclosures of which are incorporated herein by reference in their entireties.

FIELD

Exemplary embodiments relate to prediction encoding using motion compensation.

BACKGROUND ART

In typical image encoding and decoding methods, in order to encode an image, one picture is split into macro blocks. After that, prediction encoding is performed on each macro block by using inter prediction or intra prediction.

Inter prediction refers to a method of compressing an image by removing temporal redundancy between pictures and its representative example is motion estimation encoding. In motion estimation encoding, each block of a current picture is predicted by using at least one reference picture. A reference block that is most similar to a current block is found within a predetermined search range by using a predetermined evaluation function.

A current block is predicted based on a reference block, and a residual block obtained by subtracting from the current block a prediction block generated as a prediction result is encoded. In this case, in order to more accurately perform prediction, interpolation is performed on a range of searching the reference picture, sub-pel-unit pixels smaller than integer-pel-unit pixels are generated, and inter prediction is performed on the generated sub-pel-unit pixels.

SUMMARY

Exemplary embodiments provide a method and apparatus for determining filter coefficients of a symmetric or asymmetric interpolation filter so as to generate a sub-pel-unit pixel by interpolating integer-pel-unit pixels.

According to an aspect of one or more exemplary embodiments, there is provided an image interpolation method which is performable by using a transformation-based interpolation filter, the method including selecting, from among a plurality of interpolation filters, and based on a sub-pel-unit interpolation location in a region which is supported by the plurality of interpolation filters which are configured for generating at least one sub-pel-unit pixel value located between integer-pel-unit pixels, one of a symmetric interpolation filter and an asymmetric interpolation filter; and using the selected interpolation filter to generate the at least one sub-pel-unit pixel value by interpolating the integer-pel-unit pixels.

In order to efficiently perform image interpolation, from among a plurality of interpolation filters which are configured for generating a sub-pel-unit pixel value, an interpolation filter is variably selected based on a sub-pel-unit interpolation location. The interpolation filter may be an odd- or even-number-tap interpolation filter in order to perform sub-pel-unit interpolation. The interpolation filter may be selected as a symmetric interpolation filter or as an asymmetric interpolation filter, based on an interpolation location.

BRIEF DESCRIPTION OF DRAWINGS

FIGS. 9A, 9B, 9C, and 9D respectively show filter coefficients of 3-tap through 6-tap interpolation filters determined based on an interpolation location and a window filter size, according to exemplary embodiments;

FIGS. 10A, 10B, and 10C respectively show filter coefficients of 7-tap interpolation filters determined based on an interpolation location and a window filter size, according to exemplary embodiments;

FIGS. 11A, 11B, and 11C respectively show filter coefficients of 8-tap interpolation filters determined based on an interpolation location and a window filter size, according to exemplary embodiments;

FIGS. 12A and 12B respectively show filter coefficients of a regularized luma interpolation filter and a regularized chroma interpolation filter, according to exemplary embodiments;

FIG. 13A is a block diagram of a video encoding apparatus using an interpolation filter, according to an exemplary embodiment;

FIG. 13B is a block diagram of a video decoding apparatus using an interpolation filter, according to an exemplary embodiment;

DETAILED DESCRIPTION

Figure 1:
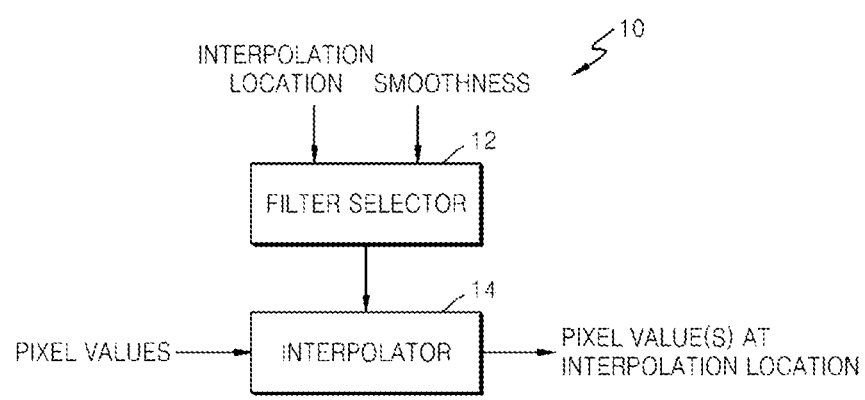
FIG. 1 is a block diagram of an image interpolation apparatus, according to an exemplary embodiment.

According to an aspect of one or more exemplary embodiments, there is provided an image interpolation method which is performable by using a transformation-based interpolation filter, the method including selecting, from among a plurality of interpolation filters, and based on a sub-pel-unit interpolation location in a region which is supported by the plurality of interpolation filters which are configured for generating at least one sub-pel-unit pixel value located between integer-pel-unit pixels, one of a symmetric interpolation filter and an asymmetric interpolation filter; and using the selected interpolation filter to generate the at least one sub-pel-unit pixel value by interpolating the integer-pel-unit pixels.

The symmetric interpolation filter may include the same number of filter coefficients on both sides of the interpolation location in a region which is supported by the symmetric interpolation filter, and the asymmetric interpolation filter may include different numbers of filter coefficients on either side of the interpolation location in a region which is supported by the asymmetric interpolation filter.

The generating of the at least one sub-pel-unit pixel value may include, if the asymmetric interpolation filter is selected, performing filtering by using filter coefficients of the asymmetric interpolation filter to support integer-pel-unit pixels asymmetrically located at both sides of the interpolation location in a region supported by the asymmetric interpolation filter; and, if the symmetric interpolation filter is selected, performing filtering by using filter coefficients of the symmetric interpolation filter to support integer-pel-unit pixels symmetrically located at both sides of the interpolation location in a region supported by the symmetric interpolation filter.

The generating of the at least one sub-pel-unit pixel value may include, if an asymmetric odd-number-tap interpolation filter which includes an odd number of filter coefficients is selected from among the plurality of interpolation filters, performing filtering by using the odd number of filter coefficients of the asymmetric odd-number-tap interpolation filter to support an odd number of integer-pel-unit pixels located on both sides of the interpolation location in a region supported by the asymmetric odd-number-tap interpolation filter; and, if a symmetric even-number-tap interpolation filter which includes an even number of filter coefficients is selected from among the plurality of interpolation filters, performing filtering by using the even number of filter coefficients of the symmetric even-number-tap interpolation filter to support an even number of integer-pel-unit pixels located on both sides of the interpolation location in a region supported by the symmetric even-number-tap interpolation filter.

Each of the interpolation filters may include, in order to interpolate the integer-pel-unit pixels in a spatial domain, filter coefficients which are obtained by combining a filter which uses a plurality of basis functions for transformation and inverse transformation, and at least one of an asymmetric window filter and a symmetric window filter.

The selecting of the interpolation filter may include selecting, from among the plurality of interpolation filters, an interpolation filter which is regularized in order to minimize a frequency response error generated as an interpolation result using the selected interpolation filter, and the regularized interpolation filter may include at least one of i) a ¼-pel-unit interpolation filter including 7-tap filter coefficients {−1, 4, −10, 58, 17, −5, 1} and having a window size of 8.7, and ii) a ½-pel-unit interpolation filter including 8-tap filter coefficients {−1, 4, −11, 40, 40, −11, 4, −1} and having a window size of 9.5.

According to another aspect of one or more exemplary embodiments, there is provided an image interpolation apparatus which uses a transformation-based interpolation filter, the apparatus including a filter selector which is configured for selecting, from among a plurality of interpolation filters and based on a sub-pel-unit interpolation location in a region which is supported by the plurality of interpolation filters which are configured for generating at least one sub-pel-unit pixel value located between integer-pel-unit pixels, one of a symmetric interpolation filter and an asymmetric interpolation filter; and an interpolator which is configured for generating the at least one sub-pel-unit pixel value by using the selected interpolation filter to interpolate the integer-pel-unit pixels.

According to another aspect of one or more exemplary embodiments, there is provided a video encoding apparatus which uses an image interpolation filter, the apparatus including an encoder which is configured for selecting, for each block of an input picture, from among a plurality of interpolation filters and based on a sub-pel-unit interpolation location in a region supported by the plurality of interpolation filters which are configured for generating at least one sub-pel-unit pixel value located between integer-pel-unit pixels, one of a symmetric interpolation filter and an asymmetric interpolation filter, generating the at least one sub-pel-unit pixel value by using the selected interpolation filter to interpolate the integer-pel-unit pixels, performing prediction encoding, and performing transformation and quantization on a prediction result based on the prediction encoding; an output component which is configured for outputting a bitstream generated by performing entropy encoding on quantized transformation coefficients and encoding information; and a storage component which is configured for storing respective filter coefficients of the plurality of interpolation filters.

According to another aspect of one or more exemplary embodiments, there is provided a video decoding apparatus which uses an image interpolation filter, the apparatus including a receiver and extractor which are configured for receiving an encoded bitstream of a video, performing entropy decoding and parsing, and extracting encoding information and encoded data of a picture of the video; a decoder which is configured for performing inverse quantization and inverse transformation on quantized transformation coefficients of the encoded data of a current block of the picture, selecting, from among a plurality of interpolation filters and based on a sub-pel-unit interpolation location in a region supported by the plurality of interpolation filters which are configured for generating at least one sub-pel-unit pixel value located between integer-pel-unit pixels, one of a symmetric interpolation filter and an asymmetric interpolation filter, generating the at least one sub-pel-unit pixel value by using the selected interpolation filter to interpolate the integer-pel-unit pixels, and performing prediction decoding in order to restore the picture; and a storage component which is configured for storing respective filter coefficients of the plurality of interpolation filters.

According to another aspect of one or more exemplary embodiments, there is provided a non-transitory computer readable recording medium having recorded thereon a program for executing the above method.

In the following description, an 'image' may comprehensively refer to a moving image such as a video, and/or a still image.

Interpolation using an asymmetric interpolation filter and a symmetric interpolation filter in consideration of smoothing, according to an exemplary embodiment, is disclosed with reference to FIGS. 1 through 12B. Also, video encoding and decoding using an asymmetric interpolation filter and a symmetric interpolation filter, according to an exemplary embodiment, are disclosed with reference to FIGS. 13A through 27. More particularly, video encoding and decoding using an asymmetric interpolation filter and a symmetric interpolation filter based on coding units having a tree structure, according to an exemplary embodiment, are disclosed with reference to FIGS. 15 through 25.

Interpolation using an asymmetric interpolation filter and a symmetric interpolation filter in consideration of smoothing, according to an exemplary embodiment, will now be described in detail with reference to FIGS. 1 through 12B.

FIG. 1 is a block diagram of an image interpolation apparatus 10, according to an exemplary embodiment.

The image interpolation apparatus 10 using symmetric and asymmetric interpolation filters includes a filter selector 12 and an interpolator 14. Operations of the filter selector 12 and the interpolator 14 of the image interpolation apparatus 10 may be cooperatively controlled by a video encoding processor, a central processing unit (CPU), and a graphic processor.

The image interpolation apparatus 10 may receive an input image and may generate sub-pel-unit pixel values by interpolating integer-pel-unit pixels. The input image may include any one or more of a picture sequence, a picture, a frame, and/or blocks of a video.

The filter selector 12 may variably select an interpolation filter for generating at least one sub-pel-unit pixel value located between integer-pel units, based on a sub-pel-unit interpolation location.

The interpolator 14 may interpolate integer-pel-unit pixels adjacent to the sub-pel-unit interpolation location by using the interpolation filter selected by the filter selector 12, thereby generating sub-pel-unit pixel values. Interpolation filtering of integer-pel-unit pixels to generate sub-pel-unit pixel values may include interpolation filtering of integer-pel-unit reference pixel values including integer-pel-unit pixels adjacent to the sub-pel-unit interpolation location in a region supported by the interpolation filter.

The interpolation filter may include filter coefficients for transforming integer-pel-unit reference pixels based on a plurality of basis functions, and for inversely transforming a plurality of coefficients generated as a transformation result.

The interpolation filter may be a one-dimensional filter or a two-dimensional filter. If the selected interpolation filter is a one-dimensional filter, the interpolator 14 may continuously perform filtering by using one-dimensional interpolation filters in two or more directions, thereby generating a current sub-pel-unit pixel value.

The filter selector 12 may individually select an interpolation filter based on the sub-pel-unit interpolation location. The interpolation filter may include a symmetric interpolation filter which includes the same numbers of filter coefficients on both sides of an interpolation location in a region supported by the symmetric interpolation filter, and an asymmetric interpolation filter which includes different numbers of filter coefficients on either side of an interpolation location in a region supported by the asymmetric interpolation filter. The filter selector 12 may individually select a symmetric interpolation filter and an asymmetric interpolation filter based on the sub-pel-unit interpolation location.

For example, a 7-tap interpolation filter may include three filter coefficients and four filter coefficients on either side of an interpolation location in a region supported by the 7-tap interpolation filter. In this case, the 7-tap interpolation filter may be regarded as an asymmetric interpolation filter.

For example, an 8-tap interpolation filter may include four filter coefficients on each side of an interpolation location in a region supported by the 8-tap interpolation filter. In this case, the 8-tap interpolation filter may be regarded as a symmetric interpolation filter.

If the filter selector 12 selects an asymmetric interpolation filter, the interpolator 14 may perform filtering on integer-pel-unit pixels which are asymmetrically located with respect to an interpolation location. Conversely, if a symmetric interpolation filter is selected, the interpolator 14 may perform filtering on integer-pel-unit pixels which are symmetrically located with respect to an interpolation location.

The interpolation filter may include an asymmetric odd-number-tap interpolation filter which includes an odd number of filter coefficients, and a symmetric even-number-tap interpolation filter which includes an even number of filter coefficients. The filter selector 12 may individually select an asymmetric odd-number-tap interpolation filter and a symmetric even-number-tap interpolation filter based on the sub-pel-unit interpolation location. For example, a ½-pel-unit interpolation filter and a ¼-pel-unit interpolation filter may be individually and variably selected. Thus, an 8-tap interpolation filter, i.e., a symmetric even-number-tap interpolation filter, may be selected as the ½-pel-unit interpolation filter, and a 7-tap interpolation filter, i.e., an asymmetric odd-number-tap interpolation filter, may be selected as the ¼-pel-unit interpolation filter.

In order to interpolate integer-pel-unit pixels in a spatial domain, each interpolation filter may be obtained by combining filter coefficients for performing transformation and inverse transformation by using a plurality of basis functions, and window filter coefficients for performing low pass filtering.

The interpolation filter may be generated based on a window filter that is asymmetric with respect to an interpolation location or a window filter that is symmetric with respect to an interpolation location.

The asymmetric interpolation filter may also be generated by combining a filter for performing transformation and inverse transformation based on a plurality of basis functions with an asymmetric window filter.

If an odd-number-tap interpolation filter is selected, the interpolator 14 may perform filtering on an odd number of integer-pel-unit pixels located with respect to an interpolation location, by using an odd number of filter coefficients of the odd-number-tap interpolation filter.

If an even-number-tap interpolation filter is selected, the interpolator 14 may perform filtering on an even number of integer-pel-unit pixels located with respect to an interpolation location, by using an even number of filter coefficients of the even-number-tap interpolation filter.

The odd-number-tap interpolation filter may include different numbers of filter coefficients on either side of an interpolation location in a corresponding supporting region and thus may be an asymmetric interpolation filter. The even-number-tap interpolation filter may be a symmetric interpolation filter which includes the same number of filter coefficients on both sides of an interpolation location in a corresponding supporting region.

The filter selector 12 may select an interpolation filter which is regularized in order to minimize a frequency response error generated as an interpolation result when using the interpolation filter. For example, the regularized interpolation filter may include at least one of i) a ¼-pel-unit interpolation filter including 7-tap filter coefficients {−1, 4, −10, 58, 17, −5, 1} and having a window size of 8.7, and ii) a ½-pel-unit interpolation filter including 8-tap filter coefficients {−1, 4, −11, 40, 40, −11, 4, −1} and having a window size of 9.5.

Further, the filter selector 12 may individually and variably select an interpolation filter based on color components. For example, the regularized interpolation filter for luma pixels may be determined as a ¼-pel-unit 7-tap interpolation filter and a ½-pel-unit 8-tap interpolation filter. The regularized interpolation filter for chroma pixels may be determined as ⅛-pel-unit, ¼-pel-unit, and ½-pel-unit 4-tap interpolation filters.

The determined regularized interpolation filter for chroma pixels may include i) a ⅛-pel-unit interpolation filter including 4-tap filter coefficients {−2, 58, 10, −2} for a ⅛ interpolation location and having a smoothness of 0.012, ii) a ¼-pel-unit interpolation filter including 4-tap filter coefficients {−4, 54, 16, −2} for a ¼ interpolation location and having a smoothness of 0.016, iii) a ⅜-pel-unit interpolation filter including 4-tap filter coefficients {−6, 46, 28, −4} for a ⅜ interpolation location and having a smoothness of 0.018, and iv) a ½-pel-unit interpolation filter including 4-tap filter coefficients {−4, 36, 36, −4} for a ½ interpolation location and having a smoothness of 0.020.

The interpolation filter may be a mirror-reflective symmetric filter in which a filter coefficient $f(\alpha)$ of an the interpolation location $\alpha$ and a filter coefficient $f_i(1-\alpha)$ of an interpolation location $(1-\alpha)$ may be the same.

The ¼-pel-unit interpolation filter for luma pixels may be a mirror-reflective symmetric filter. Accordingly, an interpolation filter for a ¼ interpolation location and an interpolation filter for a ¾ interpolation location may include symmetrically the same coefficients. If a ¼-pel-unit 7-tap luma interpolation filter includes filter coefficients {−1, 4, −10, 58, 17, −5, 1} of a ¼ interpolation location, it may include filter coefficients {1, −5, 17, 58, −10, 4, −1} of a ¾ interpolation location.

The ⅛-pel-unit interpolation filter for chroma pixels may be a mirror-reflective symmetric filter. Accordingly, an interpolation filter for a ⅛ interpolation location and an interpolation filter for a ⅞ interpolation location may include symmetrically the same coefficients. Similarly, an interpolation filter for a ⅜ interpolation location and an interpolation filter for a ⅝ interpolation location may include symmetrically the same coefficients. The interpolation filter may be determined based on a transformation-based interpolation filter which includes filter coefficients determined by using a plurality of basis functions. Further, a smoothed interpolation filter modified from the transformation-based interpolation filter may be used to perform filtering by varying its smoothness based on the distance between an interpolation location and integer-pel-unit pixels.

The smoothness of the smoothed interpolation filter may be determined based on the distance between an interpolation location and integer-pel-unit pixels. The interpolation filter may include different filter coefficients which are based on the sub-pel-unit interpolation location and its smoothness.

The smoothness of the smoothed interpolation filter may also be determined based on the distance between an interpolation location and integer-pel-unit pixels adjacent to the interpolation location.

Further, the interpolation filter may include filter coefficients for allowing integer-pel-unit reference pixels, which are away from the interpolation location, to be smoothed.

The smoothed interpolation filter obtained by combining filter coefficients for performing transformation and inverse transformation and window filter coefficients for performing low pass filtering may include filter coefficients for giving a large weight to a integer-pel-unit reference pixel close to the interpolation location and giving a small weight to a integer-pel-unit reference pixel away from the interpolation location.

The smoothed interpolation filter may include filter coefficients for smoothing integer-pel-unit reference pixels, transforming the smoothed integer-pel-unit reference pixels by using a plurality of basis functions, and inversely transforming a plurality of coefficients generated as a transformation result.

The smoothed interpolation filter may include different filter coefficients which are determined based on its length and based on the sub-pel-unit interpolation location and its smoothness.

Further, the smoothed interpolation filter may include different filter coefficients which are determined based on a scaling ratio as an interpolation result, and based on the sub-pel-unit interpolation location, its smoothness, and its length. The filter selector 12 may select a smoothed interpolation filter of which filter coefficients are increased to integers. The interpolator 14 regularizes pixel values generated by using the smoothed interpolation filter selected by the filter selector 12.

Also, the filter selector 12 may variably select an interpolation filter based on pixel characteristics. The interpolator 14 may generate sub-pel-unit pixel values by using the interpolation filter which is selected based on pixel characteristics.

The interpolation filter which is selectable by the filter selector 12 may include a smoothed interpolation filter and a general interpolation filter that does not consider smoothing. Thus, based on respective image characteristics, the filter selector 12 may select a general interpolation filter that does not consider smoothing at all.

For example, according to another exemplary embodiment, the image interpolation apparatus 10 may perform image interpolation by using different interpolation filters based on color components.

According to another exemplary embodiment, the filter selector 12 may variably select an interpolation filter based on the sub-pel-unit interpolation location and a color component of a current pixel. According to another exemplary embodiment, the interpolator 14 may interpolate integer-pel-unit pixels by using the selected interpolation filter, thereby generating at least one sub-pel-unit pixel value.

For example, the filter selector 12 may variably determine an interpolation filter for a luma component and an interpolation filter for a chroma component.

In order to interpolate a chroma pixel, the filter selector 12 may select a smoothed interpolation filter having a greater smoothness than that of an interpolation filter for a luma pixel.

Further, in order to interpolate a chroma pixel, an interpolation filter including filter coefficients determined based on a smoothing parameter having a greater smoothness than that of an interpolation filter for a luma pixel, or an interpolation filter including filter coefficients combined with a window filter for removing more high-frequency components than an interpolation filter for a luma pixel may be selected.

In order to obtain a smooth interpolation result of a chroma component, a smoothed interpolation filter obtained by combining filter coefficients for performing transformation and inverse transformation based on a plurality of basis functions, and window filter coefficients for performing low pass filtering, may be selected.

The image interpolation apparatus 10 may include a CPU (not shown) for comprehensively controlling the filter selector 12 and the interpolator 14. Alternatively, the filter selector 12 and the interpolator 14 may be driven by individual processors (not shown) and the processors may operate cooperatively with each other, thereby operating the whole image interpolation apparatus 10. Alternatively, a processor (not shown) outside the image interpolation apparatus 10 may control the filter selector 12 and the interpolator 14.

The image interpolation apparatus 10 may include one or more data storage units (not shown) for storing input/output (I/O) data of the filter selector 12 and the interpolator 14. The image interpolation apparatus 10 may also include a memory controller (not shown) for controlling data I/O of the data storage units (not shown).

The image interpolation apparatus 10 may include an additional processor which includes a circuit for performing image interpolation. Alternatively, the image interpolation apparatus 10 may include a storage medium on which an image interpolation module is recorded, and the CPU may call and drive the image interpolation module so as to perform image interpolation.

Image interpolation is used to transform a low-quality image into a high-quality image, to transform an interlaced image into a progressive image, and/or to up-sample a low-quality image into a high-quality image. Further, when a video encoding apparatus encodes an image, a motion estimator and compensator may perform inter prediction by using an interpolated reference frame. The accuracy of inter prediction may be increased by interpolating a reference frame to generate a high-quality image, and performing motion estimation and compensation based on the high-quality image. Similarly, when an image decoding apparatus decodes an image, a motion compensator may perform motion compensation by using an interpolated reference frame, thereby increasing the accuracy of inter prediction.

In addition, the smoothed interpolation filter used by the image interpolation apparatus 10 may obtain a smooth interpolation result by reducing high-frequency components in an interpolation result using an interpolation filter. Because the high-frequency components reduce the efficiency of image compression, the efficiency of image encoding and decoding may also be improved by performing smoothness-adjustable image interpolation.

Further, a symmetric interpolation filter in which filter coefficients are symmetrically located with respect to an interpolation location or an asymmetric interpolation filter in which filter coefficients are asymmetrically located with respect to an interpolation location may be selectively used. Also, as an interpolation filter, an odd-number-tap interpolation filter or an even-number-tap interpolation filter may be selectively used based on an interpolation location. Accordingly, the image interpolation apparatus 10 may perform image interpolation filtering on integer-pel-unit pixels asymmetrically located with respect to an interpolation location as well as integer-pel-unit pixels symmetrically located with respect to an interpolation location.

Interpolation using an interpolation filter obtained by combining filter coefficients for performing transformation and inverse transformation based on a plurality of basis functions with window filter coefficients, according to exemplary embodiments, will now be described in detail with reference to FIGS. 2 through 7B.

Figure 2:
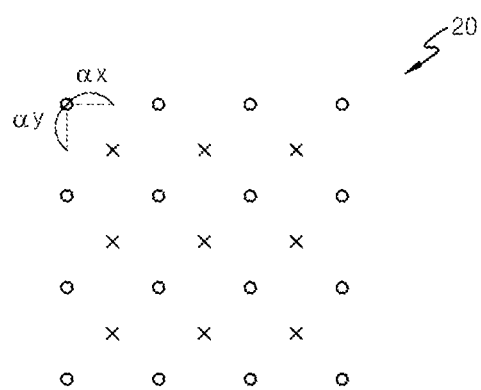
FIG. 2 is a diagram which illustrates a relationship between an integer-pel unit and a sub-pel unit.

FIG. 2 is a diagram which illustrates a relationship between an integer-pel unit and a sub-pel unit.

Referring to FIG. 2, the image interpolation apparatus 10 generates pixel values of locations 'X' by interpolating integer-pel-unit pixel values of locations 'O' of a predetermined block 20 in a spatial domain. The pixel values of the locations 'X' are sub-pel-unit pixel values of interpolation locations determined by $\alpha x$ and $\alpha y$. Although FIG. 2 illustrates that the predetermined block 20 is a 4×4 block, it will be understood by one of ordinary skill in the art that the block size is not limited to 4×4 and may be greater or smaller than 4×4.

In video processing, a motion vector is used to perform motion compensation and prediction on a current image. According to prediction encoding, a previously decoded image is referred to so as to predict a current image, and a motion vector indicates a predetermined point of a reference image. Therefore, a motion vector indicates an integer-pel-unit pixel of a reference image.

However, a pixel to be referred to by a current image may be located between integer-pel-unit pixels of a reference image. Such a location is referred to as a sub-pel-unit location. Because a pixel does not exist at a sub-pel-unit location, a sub-pel-unit pixel value is merely predicted by using integer-pel-unit pixel values. In other words, a sub-pel-unit pixel value is estimated by interpolating integer-pel-unit pixels.

A method for interpolating integer-pel-unit pixels will now be described in detail with reference to FIGS. 3, 4A, 4B, and 4C.

Figure 3:
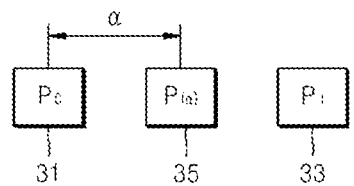
FIG. 3 is a diagram which illustrates adjacent integer-pel-unit pixels to be referred to so as to determine a sub-pel-unit pixel value, according to an exemplary embodiment.

FIG. 3 is a diagram which illustrates adjacent integer-pel-unit pixels to be referred to so as to determine a sub-pel-unit pixel value, according to an exemplary embodiment.

Referring to FIG. 3, the image interpolation apparatus 10 generates a sub-pel-unit pixel value 35 of an interpolation location by interpolating integer-pel-unit pixel values 31 and 33 in a spatial domain. The interpolation location is determined by $\alpha$.

Figure 4A:
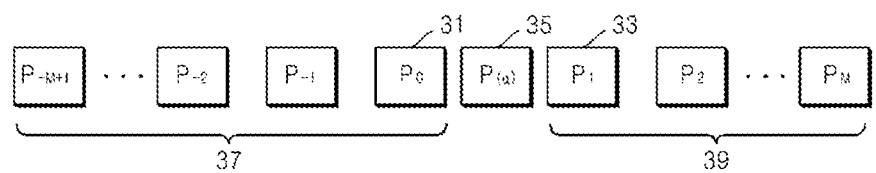
FIGS. 4A, 4B, and 4C are diagrams which illustrate examples of integer-pel-unit pixels to be referred to so as to determine a sub-pel-unit pixel value, according to an exemplary embodiment.
Figure 4B:
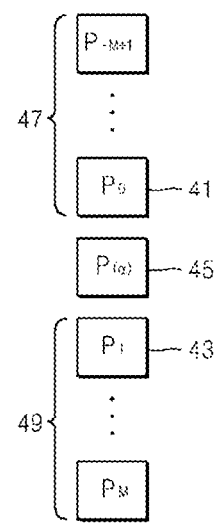
Figure 4C:
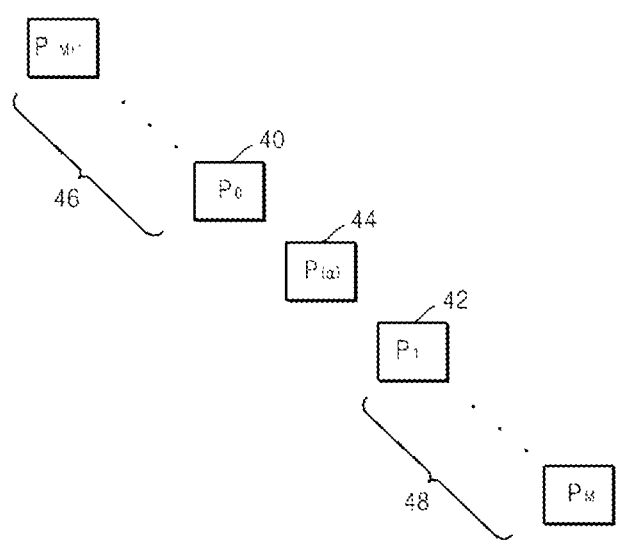

FIGS. 4A, 4B, and 4C are diagrams which illustrate examples of integer-pel-unit pixels to be referred to so as to determine a sub-pel-unit pixel value, according to an exemplary embodiment.

Referring to FIG. 4A, in order to generate the sub-pel-unit pixel value 35 by interpolating the two integer-pel-unit pixel values 31 and 33, a plurality of adjacent integer-pel-unit pixels values 37 and 39, including the integer-pel-unit pixel values 31 and 33, are used. In other words, zero-th and first pixels may be interpolated by performing one-dimensional interpolation filtering on 2M pixel values from an $-(M-1)$th pixel value to an Mth pixel value.

Also, although FIG. 4A illustrates that pixel values in a horizontal direction are interpolated, one-dimensional interpolation filtering may alternatively be performed by using pixel values in a vertical or diagonal direction.

Referring to FIG. 4B, a pixel value $P(\alpha)$ of an interpolation location $\alpha$ may be generated by interpolating pixels $P_0$ 41 and $P_1$ 43 that are adjacent to each other in a vertical direction. When FIGS. 4A and 4B are compared, their interpolation filtering methods are similar, and the only difference therebetween is that pixel values 47 and 49 aligned in a vertical direction are interpolated in FIG. 4B while the pixel values 37 and 39 aligned in a horizontal direction are interpolated in FIG. 4A.

Referring to FIG. 4C, similarly, a pixel value 44 of the interpolation location $\alpha$ is generated by interpolating two adjacent pixel values 40 and 42. The only difference from FIG. 4A is that pixel values 46 and 48 aligned in a diagonal direction are used instead of the pixel values 37 and 39 aligned in a horizontal direction.

In addition to the directions shown in FIGS. 4A, 4B, and 4C, one-dimensional interpolation filtering may be performed in various directions.

Interpolation filtering may be performed to interpolate integer-pel-unit pixels for generating a sub-pel-unit pixel value. The interpolation filtering may be represented by the following equation.

$$p(\alpha)=f(\alpha) \times p = \Sigma_{-M+1}^{M} f_m \cdot p_m$$

A pixel value $p(x)$ is generated by performing interpolation according to a dot product of a vector p of 2M integer-pel-unit reference pixels $\{p_m\}=\{p_{-M+1}, p_{-m+2}, \ldots, p_0, p_1, \ldots, p_M\}$ and a vector $f(x)$ of filter coefficients $\{f_m\}=\{f_{-M+1}, f_{-M+2}, \ldots, f_0, f_1, \ldots, f_M\}$. Because a filter coefficient $f(\alpha)$ varies according to the interpolation location $\alpha$ and a pixel value $p(\alpha)$ obtained by performing interpolation is determined based on the filter coefficient $f(\alpha)$, a selected interpolation filter, i.e., the determined filter coefficient $f(x)$, greatly influences the performance of interpolation filtering.

Image interpolation using transformation and inverse transformation based on basis functions, and a method for determining an interpolation filter, will now be described in detail.

An interpolation filter using transformation and inverse transformation initially transforms pixel values by using a plurality of basis functions having different frequency components. Transformation may include all types of transformation from pixel values in a spatial domain into coefficients in a transformation domain, and may include discrete cosine transformation (DCT). Integer-pel-unit pixel values are transformed by using a plurality of basis functions. A pixel value may include either or both of a luma pixel value and a chroma pixel value. Basis functions are not limited to particular basis functions, and may include all basis functions for transforming pixel values in a spatial domain into pixel values in a transformation domain. For example, a basis function may include a cosine or sine function for performing DCT and inverse DCT (IDCT). Alternatively, various basis functions, such as a spline function and a polynomial basis function, may be used. Also, DCT may include modified DCT (MDCT) and/or MDCT with windowing.

The interpolation filter using transformation and inverse transformation shifts phases of the basis functions used to perform transformation and inversely transforms values of a plurality of coefficients generated by using the phase-shifted basis functions, i.e., values in a transformation domain. As an inverse transformation result, pixel values in a spatial domain are output, and the output values may include pixel values of an interpolation location.

Filter Coefficients Using Orthogonal Transformation and Inverse Transformation Based on Orthogonal Basis Functions A case when the interpolator 14 performs interpolation filtering using transformation and inverse transformation based on orthogonal basis functions will now be described in detail. In particular, DCT is described as an example of the transformation.

For example, referring to FIG. 4A, in order to generate the sub-pel-unit pixel value 35 by interpolating the two integer-pel-unit pixel values 31 and 33, by using a plurality of adjacent integer-pel-unit pixels values 37 and 39 including the integer-pel-unit pixel values 31 and 33, zero-th and first pixels may be interpolated by performing one-dimensional DCT on 2M pixel values from an $-(M-1)$th pixel value to an Mth pixel value, and performing one-dimensional IDCT based on phase-shifted basis functions.

The interpolator 14 initially performs one-dimensional DCT on integer-pel-unit pixel values. One-dimensional DCT may be performed as represented in Equation 38.

$$C_k = \frac{1}{M} \sum_{l=-M+1}^{M} p(l) \cos\left(\frac{(2l-1+2M)k\pi}{4M}\right). \qquad \text{[Equation 38]}$$

$$0 \le k \le 2M - 1$$

$p(l)$ represents the pixel values 37 and 39 from an $-(M-1)$th pixel value to an Mth pixel value, and $C_k$ represents a plurality of coefficients in a frequency domain, which are generated by performing one-dimensional DCT on the pixel values 37 and 39. In this case, k is a positive integer that satisfies the above condition of Equation 38.

After one-dimensional DCT is performed on the pixel values 37 and 39 by using Equation 38, the interpolator 14 performs inverse transformation on the coefficients as represented in Equation 39.

$$P(\alpha) = \frac{C_0}{2} + \sum_{k=1}^{2M-1} C_k \cos\left(\frac{(2\alpha-1+2M)k\pi}{4M}\right) \qquad \text{[Equation 39]}$$

$\alpha$ represents an interpolation location between two pixel values as illustrated in FIG. 13, and may have any of various fractional values, such as, for example, ½, ¼, ¾, ⅛, ⅜, ⅝, ⅞, 1/16, etc. The fractional value is not limited to a particular value, and a may be a real value instead of a fractional value. $P(\alpha)$ represents the sub-pel-unit pixel value 35 of the interpolation location $\alpha$, which is generated as a one-dimensional IDCT result.

When Equation 39 is compared to Equation 38, the phase of a cosine function that is a basis function used to perform IDCT is determined based on a fractional number a instead of an integer l, and thus is different from the phase of a basis function used to perform one-dimensional DCT. In particular, the phase of each basis function used to perform inverse transformation, i.e., a cosine function, is shifted according to $2\alpha$. If the interpolator 14 performs IDCT based on the phase-shifted cosine functions according to Equation 39, the sub-pel-unit pixel value 35 of the interpolation location α, i.e., P(α), is generated.

DCT according to Equation 38 is expressed by a determinant represented in Equation 40.

$$C = D \times REF \quad \text{[Equation 40]}$$

Here, C is a 2M×1 matrix of the 2M coefficients described above in relation to Equation 38, and REF is a 2M×1 matrix of the integer-pel-unit pixel values, i.e., $p_{-(M-1)}, \ldots P_M$ pixel values, as described above in relation to Equation 38. The number of integer-pel-unit pixel values used to perform interpolation, i.e., 2M, refers to the number of taps of a one-dimensional interpolation filter. D is a square matrix for performing one-dimensional DCT and may be defined as represented in Equation 4.

$$D_{kl} = \frac{1}{M}\cos\left(\frac{(2l-1+2M)k\pi}{4M}\right) \quad \text{[Equation 4]}$$
$$0 \leq k \leq 2M - 1$$
$$-(M-1) \leq l \leq M$$

k and l are integers that satisfy the above conditions, and $D_{kl}$ refers to a row k and a column l of the square matrix D for performing DCT in Equation 40. M is the same as that of Equation 40.

IDCT which is performed by using a plurality of phase-shifted basis functions according to Equation 39 is expressed by a determinant represented in Equation 5.

$$P(\alpha) = W(\alpha) \times C \quad \text{[Equation 5]}$$

Here, P(α) is the same as that of Equation 39, and W(α) is a 1×2M matrix for performing one-dimensional IDCT by using a plurality of phase-shifted basis functions and may be defined as represented in Equation 6.

$$W_0(\alpha) = \frac{1}{2} \quad \text{[Equation 6]}$$
$$W_k(\alpha) = \cos\left(\frac{(2\alpha - 1 + 2M)k\pi}{4M}\right),$$
$$1 \leq k \leq 2M - 1$$

k is an integer that satisfies the above condition, and $W_k(\alpha)$ refers to a column k of the matrix W(α) as described above in relation to Equation 5. A filter F(α) for performing one-dimensional DCT and one-dimensional IDCT using a plurality of phase-shifted basis functions based on Equations 3 and 5 may be defined as represented in Equation 7.

$$P(\alpha) = F(\alpha) \times REF \quad \text{[Equation 7]}$$
$$F_l(\alpha) = \sum_{k=0}^{2M-1} W_k(\alpha) D_{kl}$$
$$0 \leq k \leq 2M - 1$$
$$-(M-1) \leq l \leq M$$

k and l are integers that satisfy the above conditions, $F_l(\alpha)$ refers to a column l of F(α), and W(α) and D are the same as those of Equation 40.

Interpolation Filter Coefficients for Scaled Interpolation

Various interpolation filter generation methods according to an exemplary embodiment are based on an arithmetic expression for generating a floating point number instead of an integer, and absolute values of filter coefficients are usually not greater than 1. In particular, a calculation result of a real number instead of an integer may be generated by a sub-pel-unit interpolation location α.

The efficiency of integer-based calculation is greater than that of floating-point-based calculation. As such, the image interpolation apparatus 10 may improve the calculation efficiency of interpolation filtering by scaling filter coefficients into integers by using a scaling ratio. In addition, because a bit depth of pixel values is increased, the accuracy of interpolation filtering may also be improved.

The image interpolation apparatus 10 may multiply filter coefficients $f_m(\alpha)$ by a predetermined value, and may perform image interpolation by using large filter coefficients $F_m(\alpha)$. For example, the filter coefficients $F_m(\alpha)$ may be scaled from the filter coefficients $f_m(\alpha)$ as represented in Equation 8.

$$F_m(\alpha) = \text{int}(f_m(\alpha) \cdot 2^n) \quad \text{[Equation 8]}$$

For efficiency of calculation, the scaling ratio may be in the form of $2^n$. n may be equal to zero or a positive integer. An interpolation filtering result using filter coefficients scaled by $2^n$ may have a bit depth scaled by n bits in comparison to a result obtained by using original filter coefficients.

Integer calculation interpolation filtering using the scaled filter coefficients $F_m(\alpha)$ may satisfy Equation 9. In particular, after interpolation filtering is performed by using the scaled filter coefficients $F_m(\alpha)$, the scaled bit depth must be restored to an original bit depth.

$$p(\alpha) = (\Sigma_{-M+1}^{M} F_m(\alpha) \cdot p_m + \text{offset}) >> \quad \text{[Equation 9]}$$

In this case, an offset may be equal to $2^{n-1}$.

In particular, because an scaled filtering result using an scaled interpolation filter must be reduced by a scaling ratio, i.e., $2^n$, so as to be restored to original bits, a bit depth of the scaled filtering result may be reduced by n bits.

If two-step interpolation filtering is performed by performing one-dimensional interpolation filtering in a horizontal direction and performing one-dimensional interpolation filtering in a vertical direction, a reduction may be made by a total of 2n bits. Accordingly, if a first one-dimensional interpolation filter is scaled by n1 bits and a second one-dimensional interpolation filter is scaled by n2 bits, after two-step interpolation filtering is performed by using the first and second one-dimensional interpolation filters, a reduction may be made by a sum of n1 and n2, i.e., 2n bits. The first one-dimensional interpolation filter may be an interpolation filter that is not scaled.

Because a sum of the filter coefficients $f_m(\alpha)$ is equal to 1, as expressed in Equation 10 below:

$$\Sigma_{-M+1}^{M} f_m(\alpha) = 1 \quad \text{[Equation 10]}$$

a condition for regularizing the filter coefficients $F_m(\alpha)$ of the scaled interpolation filter must satisfy Equation 11.

$$\Sigma_{-M+1}^{M} f_m(\alpha) = 1 \quad \text{[Equation 11]}$$

However, the regularization condition according to Equation 11 may cause a rounding error. The image interpolation apparatus 10 may round off the scaled filter coefficients $F_m(\alpha)$ based on the regularization condition according to Equation 11. For regularization, some of the scaled filter coefficients $F_m(\alpha)$ may be adjusted within a predetermined range of original values. For example, some of the scaled filter coefficients $F_m(\alpha)$ may be adjusted within a range of ±1 in order to correct a rounding error.

For an interpolation filter having an odd number of reference pixels or an asymmetric interpolation filter with respect to an interpolation location, the interpolator 14 may change an interpolation filter using transformation and inverse transformation based on a plurality of basis functions.

Image interpolation which is performed by using an odd-number-tap interpolation filter which includes an odd number of filter coefficients as an interpolation filter using transformation and inverse transformation based on a plurality of basis functions will be described below.

Asymmetric Interpolation Filter

Figure 5A:
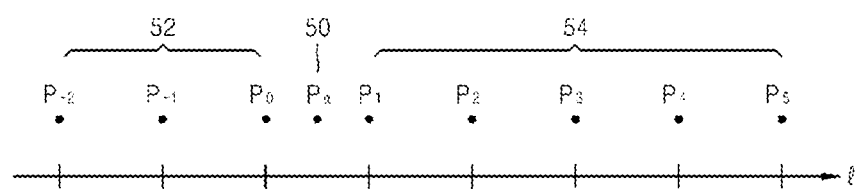
FIG. 5A is a diagram which illustrates an interpolation filtering method using reference pixels asymmetrically located with respect to an interpolation location in order to determine a sub-pel-unit pixel value, according to an exemplary embodiment.

FIG. 5A is a diagram which illustrates an interpolation filtering method using reference pixels asymmetrically located with respect to an interpolation location in order to determine a sub-pel-unit pixel value, according to an exemplary embodiment.

It is assumed that, in order to calculate a pixel $p(\alpha)$ 50 of a sub-pel-unit interpolation location $\alpha$, left reference pixels 52 and right reference pixels 54 with respect to the interpolation location $\alpha$ are used to perform interpolation filtering. The number of the left reference pixels 52 is three and the number of the right reference pixels 54 is five. Because an odd number of pixels are supported by the interpolation filtering, the left and right reference pixels 52 and 54 are asymmetrically located with respect to the interpolation location $\alpha$.

As described above in relation to Equations 38 through 40 and 4 through 7, interpolation filtering is performed by using 2M integer-pel-unit reference pixels $p_{-M+1}$, $p_{-M+2}$, ..., $p_0$, $p_1$, ..., $p_M$ which are symmetrically distributed with respect to the interpolation location $\alpha$. That is, if reference pixels are represented as $p_l$, the range of an integer l is represented as $-M+1 \le l \le M$.

If the interpolation location $\alpha$ of Equations 38 through 40 and 4 through 7 is moved in parallel translation to a-h, filter coefficients of an interpolation filter using reference pixels asymmetrically located with respect to the interpolation location $\alpha$ as illustrated in FIG. 5A may be generated by using Equations 38 through 40 and 4 through 7.

In particular, if the asymmetric left and right reference pixels 52 and 54 are represented as $p_l$, the range of an integer l is $-M+1+h \le l \le M+h$. In this case, M is 4 and h is 1. The number of the left reference pixels 52 is one less than that in a case when 2M reference pixels are symmetrically distributed with respect to the interpolation location $\alpha$.

The interpolation filter according to Equations 38 through 40 and 4 through 7 is a one-dimensional filter. In order to perform two-dimensional filtering by using the one-dimensional filter, interpolation filtering is performed in a vertical direction and in a horizontal direction. In other words, one-dimensional interpolation filtering is performed twice. From among the performing of the one-dimensional interpolation filtering two times, for performing motion compensation, the second one-dimensional interpolation filtering uses a filter of which the number of filter taps is increased by a half and the first one-dimensional interpolation filtering is performed on an expanded block.

When interpolation filtering is performed on a left boundary of a block, the block must be expanded leftward from the left boundary. If a symmetric interpolation filter using 2M reference pixels which are symmetrically located with respect to the interpolation location $\alpha$ is used, in order to perform interpolation filtering, the block must be expanded leftward by M pixels.

However, if an asymmetric interpolation filter using reference pixels which are asymmetrically located with respect to the interpolation location $\alpha$ is used, in order to perform interpolation filtering, a filtering region must be expanded leftward of the block by M-h pixels. Similarly, if h is a negative direction, when interpolation filtering is performed on a right boundary of a block, a filtering region must be expanded rightward of the block by M+h pixels. In other words, if interpolation filtering is performed on a boundary of a block, in comparison to a case when a symmetric interpolation filter is used, when an asymmetric interpolation filter is used, a region of the block to be expanded may be reduced. As such, a storage space for storing pixel values of the expanded region may be reduced, and the amount of calculation for expanding the block may also be reduced.

Odd-Number-Tap Interpolation Filter

Figure 5B:
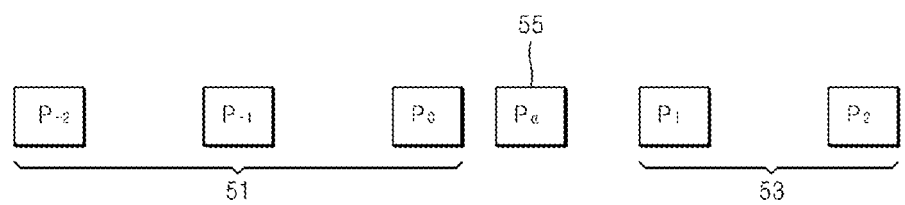
FIG. 5B is a diagram which illustrates an interpolation method using an interpolation filter including an odd number of filter coefficients in order to determine a sub-pel-unit pixel value, according to an exemplary embodiment.

FIG. 5B is a diagram which illustrates an interpolation method using an interpolation filter including an odd number of filter coefficients in order to determine a sub-pel-unit pixel value, according to an exemplary embodiment.

It is assumed that, in order to calculate a pixel $p(\alpha)$ 55 of a sub-pel-unit interpolation location $\alpha$, an interpolation filter uses reference pixels $\{p_{-2}, p_{-1}, p_0, p_1, p_2\}$. The number of reference pixels is five, i.e., an odd number, and three left reference pixels 51 and two right reference pixels 53 with respect to the interpolation location $\alpha$ may be referred to so as to perform interpolation filtering.

Because the left and right reference pixels 51 and 53 are asymmetrically located with respect to the interpolation location $\alpha$ and the number of the right reference pixels 53 is less than that of the left reference pixels 51, the interpolation filter illustrated in FIG. 5B may be effective to perform interpolation filtering on a right boundary of a block.

Initially, according to Equations 12 through 15 below, filter coefficients $\{p(\alpha)\}$ of an interpolation filter using reference pixels $\{p_l\}$ in which the range of an integer l is $-M+1 \le l \le M-1$, and having a filter size Size (i.e., the number of filter taps) of 2M-1 are determined.

$$D_{lk} = \frac{2}{\text{Size}} \cos\left(\frac{\pi k(l + \text{Size}/2)}{\text{Size}}\right) \qquad \text{[Equation 12]}$$
$$-M+1 \le l \le M-1;$$
$$0 \le k \le \text{Size} - 1$$

$$W_k = \cos\left(\frac{\pi k(\alpha + \text{Size}/2)}{\text{Size}}\right); \qquad \text{[Equation 13]}$$
$$0 \le k \le \text{Size} - 1$$

$$\text{Filter}_l(\alpha) = \sum_{k=0}^{\text{Size}-1} W_k D_{lk} \qquad \text{[Equation 14]}$$

$$p(\alpha) = \sum_{l=-M+1}^{M-1} \text{Filter}(\alpha)_l p_l \qquad \text{[Equation 15]}$$

If M is equal to 3, interpolation filter coefficients of FIG. 5B may be determined according to Equation 15.

Alternatively, according to Equations 16 through 19 below, filter coefficients $\{p(\alpha)\}$ of an interpolation filter using reference pixels $\{p_l\}$ in which the range of an integer l is −M+2≤l≤M, and having a filter size Size (i.e., the number of filter taps) of 2M−1 may be determined.

$$D_{lk} = \frac{2}{Size} \cos\left(\frac{\pi k(l + Size/2)}{Size}\right);$$
$$-M + 2 \leq l \leq M;$$
$$0 \leq k \leq Size - 1$$

[Equation 16]

$$W_k = \cos\left(\frac{\pi k(\alpha + Size/2)}{Size}\right)$$

[Equation 17]

$$Filter_l(\alpha) = \sum_{k=0}^{Size-1} W_k D_{lk}$$

[Equation 18]

$$p(\alpha) = \sum_{l=-M+2}^{M} Filter(\alpha)_l p_l$$

[Equation 19]

Interpolation filtering using the filter coefficients determined according to Equation 19 may be performed on pixels moved in parallel translation by one to the right from the reference pixels of FIG. 5B.

In Equations 12 through 19, α is not limited to a value equal to or greater than zero and equal to or less than one. In other words, α may have a value which is less than zero or greater than one. Accordingly, based on Equations 12 through 19, an odd-number-tap interpolation filter having an odd number of filter taps may be obtained. Because the number of filter taps is an odd number, interpolation filtering using the interpolation filter may be performed on an odd number of reference pixels.

The interpolation filter may also be obtained by combining an interpolation filter using reference pixels which are asymmetrically located with respect to an interpolation location, and an odd-number-tap interpolation filter. That is, an interpolation filter for performing interpolation filtering on an odd number of pixels which are asymmetrically located with respect to an interpolation location is also available.

If the center of reference pixels in Equations 12 through 15 is generalized, filter coefficients of an interpolation filter may be induced according to Equations 20 and 21 below.

$$C_k = \sum_{l=M_{min}}^{M_{max}} D_{lk} \cdot p_l$$

[Equation 20]

$$D_{lk} = \frac{2}{Size} \cdot \cos\left(\frac{\pi \cdot k \cdot (2 \cdot l - 2 \cdot Center + Size)}{2 \cdot Size}\right)$$

[Equation 21]

Here, $M_{max}$ and $M_{min}$ respectively represent minimum and maximum index values from among reference pixels, and may represent the range of the reference pixels. Accordingly, a filter size (i.e., "Size") may be determined as $M_{max}-M_{min}+1$. For example, in a 7-tap interpolation filter, if $M_{max}=3$ and $M_{min}=-3$, a central index (i.e. "Center") of reference pixels may be equal to zero. In other words, Center has an average value of $M_{max}$ and $M_{min}$.

Also, if a basis function for an interpolation filter according to Equations 20 and 21 is represented as a basis function Wk of a cosine transformation function, Equations 22 and 23 below are induced.

$$p_\alpha = \sum_{k=0}^{Size-1} W_k \cdot C_k$$

[Equation 22]

$$W_0 = \frac{1}{2};$$

[Equation 23]

$$W_k = \cos\left(\frac{\pi \cdot k \cdot (2 \cdot \alpha - 2 \cdot Center + Size)}{2 \cdot Size}\right);$$
$$1 \leq k \leq Size - 1$$

Accordingly, the interpolation filter may be an asymmetric interpolation filter using reference pixels asymmetrically located with respect to an interpolation location, and may include an odd-number-tap interpolation filter of which the number of filter coefficients is an odd number. As described above in relation to Equations 38 through 40 and 4 through 7 above, the interpolation filter may also include a symmetric interpolation filter and an even-number-tap interpolation filter.

In general, an odd-number-tap interpolation filter may be an asymmetric interpolation filter. However, an even-number-tap interpolation filter may be either of a symmetric interpolation filter or an asymmetric interpolation filter. For example, an 8-tap interpolation filter may be a symmetric even-number-tap interpolation filter if it includes four filter coefficients and four filter coefficients on each side of an interpolation location in a region supported by the symmetric even-number-tap interpolation filter, and may be an asymmetric even-number-tap interpolation filter if it includes three filter coefficients and five filter coefficients on each respective side of an interpolation location in a region supported the asymmetric even-number-tap interpolation filter.

The interpolation filter may include filter coefficients generated by adjusting the smoothness of a response of the interpolation filter based on an interpolation location.

A case in which a window filter is used to determine various smoothed interpolation filters will now be described in detail.

Smoothed Interpolation Filter Using Window Filter

A method for smoothing interpolation filter coefficients by using a window filter will now be described in detail.

A window filter may use any one or more of a Hamming window function, a cosine window function, an exponential window function, a Hanning window function, a Blackman window function, and a triangle window function. Although cases when interpolation filters based on transformation and inverse transformation are smoothed by using certain window functions will be described below for convenience of explanation, it will be understood by one of ordinary skill in the art that, in addition to the described window functions, other window functions having similar frequency responses may also be used.

Window coefficients according to a Hamming window function satisfy Equation 24 below.

$$w(n) = 0.54 - 0.46\cos\left(\frac{2\pi n}{N}\right), 0 \leq n \leq N$$

[Equation 24]

In various window functions including the Hamming window function, an input n is symmetric with reference to N/2 and a frequency response is similar to that of a low pass filter. From among inputs of a window function, only an input covered by a window formed by the window function may be output. A window size N may be set as a positive integer greater than the length of an original interpolation filter. For example, in order to apply a window function to an interpolation filter for generating a sub-pel-unit pixel such as a ½ or ¼ pixel, the central location of the window function may be moved by a ½ or ¼ pixel. That is, because the central location of the window function is moved to an interpolation location, the window function may be symmetric with respect to the interpolation location.

For example, Equations 25 and 26 below show window coefficients of Hamming window functions for ½-pel-unit and ¼-pel-unit interpolation filters, respectively.

$$w_{1/2}(n) = 0.54 - 0.46\cos\frac{2\pi}{N}\left(\frac{N-1}{2}+n\right)$$ [Equation 25]

$$w_{1/4}(n) = 0.54 - 0.46\cos\frac{2\pi}{N}\left(\frac{2N-1}{4}+n\right)$$ [Equation 26]

Equation 27 below sequentially shows window coefficients of a Hamming window function, a cosine window function, and an exponential window function as window functions for interpolation filters, which are generalized according to a sub-pel-unit interpolation location α.

$$w_\alpha(n) = 0.54 - 0.46\cos\left(\frac{2\pi}{N}\left(\frac{N}{2}-\alpha+m\right)\right)$$ [Equation 27]

$$w_\alpha(n) = \cos\left(\pi\frac{m-\alpha}{N}\right)$$

$$w_\alpha(n) = \exp\{-\beta(\alpha-m)^2\}$$

By combining the window coefficients according to Equation 27 with an original interpolation filter $f_k(\alpha)$, smoothed interpolation filter coefficients may be determined according to Equation 28 below.

$$\tilde{f}_k(\alpha)=f_k(\alpha)w_\alpha(k), k=-M+1,\ldots,M$$ [Equation 28]

Because a smoothed interpolation filter is determined by using a window filter, a weight of an interpolation filter coefficient may be adjusted based on the distance between an integer-pel-unit reference pixel and an interpolation location. For example, a smoothed interpolation filter may be determined in such a way that, by a window function, from among filter coefficients of an interpolation filter, a filter coefficient for an integer-pel-unit reference pixel located far from an interpolation location is greatly smoothed, and a filter coefficient for an integer-pel-unit reference pixel located close to the interpolation location is not greatly changed.

Further, if a smoothed interpolation filter is determined by using a window filter, interpolation filtering may be performed after integer-pel-unit reference pixels are smoothed. Input integer-pel-unit reference pixels Ref={$p_{-M+1}$, $p_{-M+2}$, ..., $p_0$, $p_1$, ..., $p_M$} may include noise or may be damaged due to an error such as a quantization error. As such, if integer-pel-unit reference pixels are smoothed before interpolation filtering is performed, the image interpolation apparatus 10 may improve an interpolation effect.

Interpolation Filter Using Asymmetric Window Filter

An asymmetric window filter is asymmetric with respect to the center of the filter. Accordingly, an asymmetric window filter for an interpolation filter may be used to perform interpolation filtering asymmetrically with respect to an interpolation location.

Equation 29 below shows filter coefficients wl of an asymmetric window filter in the simplest form.

$$w_l = \cos\left(\pi\frac{l-\alpha}{N-1}\right);$$ [Equation 29]

$$-M_{min} \le l \le M_{max}$$

N represents a window size, and $M_{min}$ and $M_{max}$ represent reference pixels of the furthermost locations from an interpolation location.

Filter characteristics of a window filter may be adjusted by varying the window size N. The window size N may be equal to or greater than a filter size "Size" of an interpolation filter, and may be equal to or less than twice the filter size Size (Size≤N≤2×Size)

For example, when Equations 38 through 40 and 4 through 7 above are combined with Equation 29 above, if filter coefficients of a symmetric interpolation filter in which M is 4 are determined, because the number of reference pixels (2M) is eight, an 8-tap interpolation filter is obtained. If a window function in which the window size N=13 is used, filter coefficients of a ¼-pel-unit interpolation filter and a ½-pel-unit interpolation filter are as represented below. Here, a used scaling factor S is equal to 64.

¼-pel-unit interpolation filter coefficients {$p_l$}={−1, 4, −10, 57, 19, −7, 3, −1}

½-pel-unit interpolation filter coefficients {$p_l$}={−1, 4, −11, 40, 40, −11, 4, −1}

Similarly, when Equations 38 through 40 and 4 through 7 are combined with Equation 29, if $M_{min}$ and $M_{max}$ are variably adjusted, filter coefficients of an asymmetric interpolation filter may be determined by using an asymmetric window filter.

Smoothed Interpolation Filter Using Two Parameters

A smoothed interpolation filter may determine the smoothness of filter coefficients based on two parameters. Sub-pel-unit smoothed interpolation filter coefficients obtained by combining a smoothing matrix S and interpolation filter coefficients based on transformation and inverse transformation satisfy Equation 30 below.

$$\tilde{f}(\alpha)=f(\alpha)^T\cdot S$$ [Equation 30]

Equation 31 below shows an example of the smoothing matrix S.

$$s_{ij}=0;$$

$$\{s_{ii}=1-\sigma_i; s_{i,i+1}=\sigma_i\}; i=-M+1$$

$$\{s_{ii}=1-2\sigma_i; s_{i,i\pm 1}=\sigma_i\}; -M+1 \le i \le M$$

$$\{s_{ii}=1-\sigma_i; s_{i,i-1}=\sigma_i\}; i=M$$ [Equation 31]

The smoothing matrix S according to Equation 31 is a 3-diagonal matrix. In particular, from among components of the smoothing matrix S, components other than components on one central diagonal line and two diagonal lines corresponding to each other and adjacent to the central diagonal line are all equal to zero.

In the smoothing matrix S, a smoothness a may be determined regardless of the distance (i−α) from integer-pel-unit pixels to be interpolated. In this case, smoothing according to the smoothing matrix S may be referred to as uniform smoothing.

Further, in the smoothing matrix S, the smoothness a may be changed based on an index I of an integer-pel-unit pixel location. In this case, smoothing according to the smoothing matrix S may be referred to as non-uniform smoothing. For example, the smoothness $\sigma_i$ may satisfy Equation 32 below.

$$\sigma_i = \beta(i-\alpha)^I \qquad \text{[Equation 32]}$$

A positive index I may increase a smoothing effect if the distance between an interpolation location and an integer-pel-unit reference pixel is large. Accordingly, the positive index I may control the speed of smoothing based on the distance between an interpolation location and an integer-pel-unit reference pixel. A smoothing parameter $\beta$ may control the range of smoothing around an interpolation location.

If the smoothing parameter $\beta$ is less than zero, the smoothing matrix S according to Equation 13 may be changed into a sharpening filter. Accordingly, if the smoothing matrix S that is less than zero is combined with an interpolation filter using transformation and inverse transformation, a filter for amplifying high-frequency components may be generated.

In order to perform sub-pel-unit prediction, the image interpolation apparatus 10 may use smoothed interpolation filter coefficient data previously stored in memory.

Figure 6:
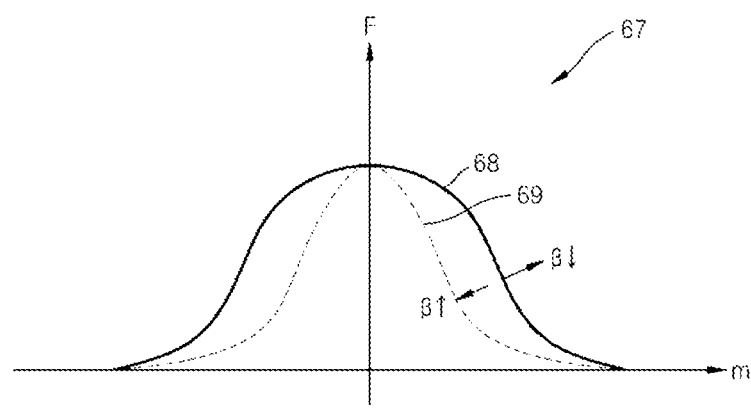
FIG. 6 is a graph of a smoothing factor based on a smoothing parameter of a smoothed interpolation filter, according to an exemplary embodiment.

FIG. 6 is a graph 67 of a smoothing factor based on a smoothing parameter $\beta$ of a smoothed interpolation filter, according to an exemplary embodiment.

First and second curves 68 and 69 show a smoothing factor for smoothing an interpolation filter based on discrete transformation. If m is large, that is, if the distance from integer-pel-unit pixels to be interpolated is increased, the smoothing factor is close to zero.

Here, in comparison to the second curve 69 in a case when the smoothing parameter $\beta$ is large, the first curve 68 in a case when the smoothing parameter $\beta$ is small has a relatively large width of the smoothing factor. In other words, if the smoothing parameter $\beta$ of the smoothed interpolation filter is large, low-frequency components may be mainly filtered, and thus, relatively strongly smoothed sub-pel-unit pixel values may be generated. If the smoothing parameter $\beta$ of the smoothed interpolation filter is relatively small, relatively high-frequency components may remain and be interpolated, and thus, sub-pel-unit pixel values may be generated.

Various interpolation filters and filter coefficients are described above. In particular, as a function for determining filter coefficients of an interpolation filter, any one or more of a window function, a spline function, a polynomial function, etc. may be used. For an interpolation filter, a frequency response of a function may vary according to a frequency, but a filter gain of the frequency response of the function may be close to one. Accordingly, the image interpolation apparatus 10 may determine filter coefficients by using a function of which a filter gain of a frequency response is closest to one, even when a frequency varies, and may select an interpolation filter including the filter coefficients.

Regularized Interpolation Filter

If a filter size of an interpolation filter is increased, the accuracy of interpolation may be improved. However, if the filter size is increased, high-frequency components remain in a filtering result, and thus, the interpolation filter is vulnerable to noise. The interpolation filter may smooth reference pixel values $\{p_l\}$ by using a cosine window function having an interpolation location $\alpha$ as its center, thereby reducing noise in an interpolation filtering result. An operation of smoothing the reference pixel values $\{p_l\}$ by using a cosine window function satisfies Equation 33 below.

$$p_l = p_l \cdot \cos\left(\pi \cdot \frac{l-\alpha}{N}\right) \qquad \text{[Equation 33]}$$

N represents a window size for smoothing but may not necessarily be an integer. Accordingly, if filtering using transformation and inverse transformation according to Equation 7 is combined with window filtering according to Equation 33, smoothed interpolation filtering for a sub-pel-unit interpolation location $\alpha$ is enabled. The smoothed interpolation filtering may be performed by using a finite impulse response (FIR) filter and satisfies Equations 34 and 35 below.

$$p_\alpha = \sum_{l=M_{min}}^{M_{max}} Filter_l(\alpha) \cdot p_l \qquad \text{[Equation 34]}$$

$$Filter_l(\alpha) = \cos\left(\pi \cdot \frac{l-\beta}{N}\right) \cdot \sum_{k=0}^{Size-1} W_k(\alpha) \cdot D_{lk} \qquad \text{[Equation 35]}$$

In Equations 34 and 35, $p_\alpha$ represents a pixel value generated as a smoothed interpolation filtering result, and $Filter_l(\alpha)$ represents filter coefficients of a smoothed interpolation filter. $M_{min}$ and $M_{max}$ represent the range of reference pixels.

In a smoothed interpolation filter for chroma pixels, a smoothing parameter of the smoothed interpolation filter may be adjusted to more greatly reduce the influence of high-frequency components. Filter coefficients of a chroma interpolation filter using a smoothing parameter may be determined as represented in Equations 36 and 37 below.

$$\tilde{W}_k = \frac{W_k(\alpha)}{1+\sigma \cdot k^2}, \qquad \text{[Equation 36]}$$
$$1 \leq k \leq Size - 1$$

$$Filter_l(\alpha) = \sum_{k=0}^{Size-1} \tilde{W}_k(\alpha) \cdot D_{lk} \qquad \text{[Equation 37]}$$

Figure 7:
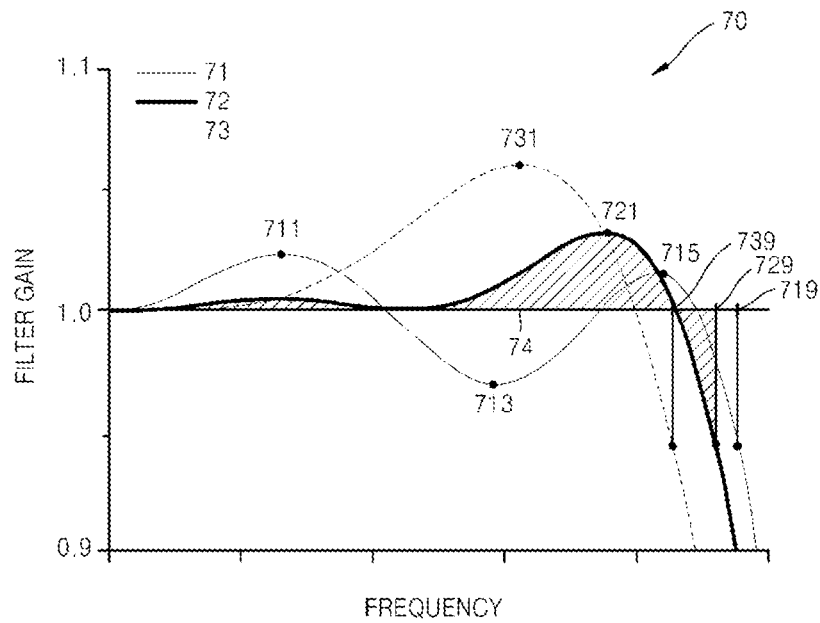
FIG. 7 is an amplitude frequency response graph of interpolation filters, according to an exemplary embodiment.

FIG. 7 is an amplitude frequency response graph 70 of interpolation filters, according to an exemplary embodiment.

If a harmonic signal having a size of one is input to the interpolation filters, the amplitude frequency response graph 70 of the interpolation filters may show results of performing interpolation filtering.

The amplitude frequency response graph 70 shows a first frequency response 71 of an 8-tap smoothed interpolation filter using DCT and IDCT based on basis functions, according to an exemplary embodiment, a second frequency response 72 of a regularized 8-tap smoothed interpolation filter according to an exemplary embodiment, and a third frequency response 73 of a 6-tap interpolation filter according to the H.264 video coding standard.

In the first, second, and third frequency responses 71, 72, and 73, hills 711, 715, 721, and 731 represent that signals are amplified at corresponding frequencies, and a valley 713 represents that a signal is damped at a corresponding frequency. An effect that an input signal is amplified or damped is not appropriate in interpolation filtering.

In an ideal amplitude frequency response 74, a filter gain is constantly maintained as 1.0 at all frequencies, and thus a hill or valley does not exist at all. This means that distortion due to interpolation filtering does not occur.

If a frequency response of an interpolation filter is closer to the ideal amplitude frequency response 74, an interpolation filtering result is more accurate. Distortion in a frequency response of an interpolation filter in comparison to the ideal amplitude frequency response 74 may be represented as a square of the difference between the frequency response of the interpolation filter and the ideal amplitude frequency response 74, i.e., an area of a difference region.

For example, distortion in a frequency response of the regularized smoothed interpolation filter in comparison to the ideal amplitude frequency response 74 may be minimized by adjusting its window filter size N and its smoothness a. The distortion in the frequency response of the regularized smoothed interpolation filter in comparison to the ideal amplitude frequency response 74 corresponds to an area of a shaded region between the ideal amplitude frequency response 74 and the second frequency response 72 in the amplitude frequency response graph 70. In particular, if the area of the shaded region is small, the accuracy of interpolation performed by using the regularized smoothed interpolation filter may be improved.

Further, because a frequency response of an FIR filter is close to zero as a frequency is close to $\pi$, the FIR filter may not generate high-frequency components. In addition, if a cut level of an interpolation filter is low, the interpolation filter may not restore detailed information of a reference image. In general, if the length of a filter is large, a high cut level may be assigned. In the amplitude frequency response graph 70, because cut levels 719 and 729 of the first and second frequency responses 71 and 72 of the smoothed interpolation filter and the regularized smoothed interpolation filter are higher than a cut level 739 of the third frequency response 73 of the H.264 interpolation filter, the smoothed interpolation filter and the regularized smoothed interpolation filter may restore detailed information of a reference image more accurately in comparison to the H.264 interpolation filter.

Accordingly, in comparison to the H.264 interpolation filter, the smoothed interpolation filter may leave high-frequency components of an input signal after performing interpolation filtering. Further, in comparison to the H.264 interpolation filter, a distortion region of the smoothed interpolation filter is relatively small, and thus, distortion in an interpolation result is relatively small.

From among smoothed interpolation filters, the second frequency response 72 of the regularized smoothed interpolation filter is relatively close to the ideal amplitude frequency response 74, and the first frequency response 71 of the unregularized smoothed interpolation filter has a relatively large distortion region due to hills and valleys. In other words, in comparison to the regularized smoothed interpolation filter, a filtering result of the unregularized smoothed interpolation filter may include more undesired artifacts.

Accordingly, as filter coefficients of an interpolation filter according to an exemplary embodiment, filter coefficients of the regularized smoothed interpolation filter for minimizing a distortion region in comparison to the ideal amplitude frequency response 74 may be selected. In other words, if the window filter size N and the smoothness a of the smoothed interpolation filter are adjusted and its filter coefficients are regularized, filter coefficients for minimizing a distortion region of a frequency response of the smoothed interpolation filter may be determined.

Therefore, interpolation filters of the image interpolation apparatus 10 may include filter coefficients which are determined in consideration of smoothing.

Phase Shift α & Motion Vector Value

The accuracy for typical motion compensation is in a sub-pel unit of a $½^P$-pel unit, such as, for example, a ½-pel unit or a ¼-pel unit. However, an interpolation location α for determining filter coefficients of a sub-pel-unit interpolation filter according to an exemplary embodiment is not limited to a $½^P$-pel unit.

In order to perform motion compensation on the interpolation location α in a sub-pel unit other than a ½-pel unit or a ¼-pel unit, partial vectors of a ½-pel-unit or ¼-pel-unit motion vector may be used. For example, a sub-pel-unit component set {α, ½, 1−α} of a ½-pel-unit motion vector MV is assumed. Because the length of coding unit components of the motion vector MV is reduced if a is less than ¼, the stability of interpolation filtering for motion compensation may be improved and coding bits for a differential motion vector may be saved.

The most commonly used color format in video coding is a 4:2:0 format. In this case, chroma samples corresponding to a half of the number of luma samples may be encoded. If the same motion vector is shared between the luma and chroma samples, the size of a chroma motion vector is a half of the size of a luma motion vector. Accordingly, a phase shift of a luma interpolation filter may be synchronized with the phase shift of a chroma interpolation filter.

For example, if the phase shift of the luma interpolation filter is {α$_i$}, the phase shift of the chroma interpolation filter may be synchronized to {α$_i$/2}∪{1−α$_i$/2}∪{½}.

For example, when motion compensation is performed by using the sub-pel-unit component set of the motion vector MV, if the phase shift of the luma interpolation filter is {α, ½, 1−α}, the phase shift of the chroma interpolation filter may be synchronized to {α/2, (1−α)/2, ½, 1−α/2, 1−(1−α)/2}.

As interpolation filters according to exemplary embodiments, an interpolation filter using transformation and inverse transformation based on a plurality of basis functions, an interpolation filter for performing interpolation in a sub-pel unit, a symmetric interpolation filter and an asymmetric interpolation filter, an odd- or even-number-tap interpolation filter, an interpolation filter using a window filter, an interpolation filter considering smoothing, and a regularized interpolation filter are described above.

The above-mentioned interpolation filters may operate individually or may be combined. For example, an interpolation filter according to an exemplary embodiment may perform interpolation in a sub-pel unit and may perform interpolation filtering regardless of whether reference pixels are symmetrically or asymmetrically located with respect to an interpolation location. IN addition, because the number of filter coefficients may be an even or odd number, the interpolation filter may perform interpolation filtering on an odd number of integer-pel-unit pixels and/or an even number of integer-pel-unit pixels. Furthermore, because filter coefficients of a regularized smoothed interpolation filter may be selected, detailed information of reference pixels may remain and undesired high-frequency components such as noise may be minimized, thereby minimizing distortion due to interpolation filtering.

Figure 8:
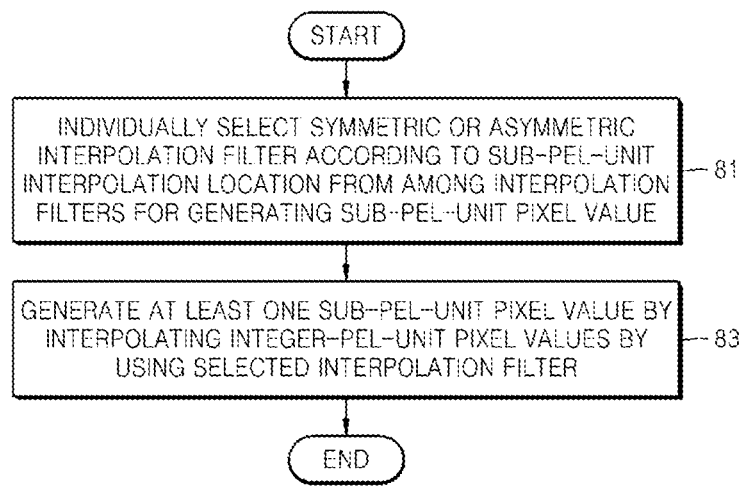
FIG. 8 is a flowchart which illustrates an image interpolation method, according to an exemplary embodiment.

FIG. 8 is a flowchart which illustrates an image interpolation method, according to an exemplary embodiment.

In operation 81, from among a plurality of interpolation filters which are configured for generating at least one subpel-unit pixel value located between integer-pel units of a picture, one of a symmetric interpolation filter and an asymmetric interpolation filter is individually selected based on a sub-pel-unit interpolation location.

The selected asymmetric interpolation filter may be an odd-number-tap interpolation filter. The selected symmetric interpolation filter may be an even-number-tap interpolation filter. In order to interpolate integer-pel-unit pixels in a spatial domain, the interpolation filter may include filter coefficients obtained by combining a filter using transformation and inverse transformation based on a plurality of basis functions with an asymmetric window filter or a symmetric window filter.

An interpolation filter which is regularized in order to minimize a frequency response error generated as an interpolation result when using the selected interpolation filter is selected. Also, in order to prevent high-frequency components such as noise from being restored, an interpolation filter which includes filter coefficients for smoothing reference pixels may be selected.

In operation 83, integer-pel-unit pixel values are interpolated by using the interpolation filter selected in operation 81, thereby generating at least one sub-pel-unit pixel value.

If an asymmetric interpolation filter is selected in operation 81, in operation 83, filtering may be performed on integer-pel-unit pixels which are asymmetrically located with respect to an interpolation location. If a symmetric interpolation filter is selected in operation 81, in operation 83, filtering may be performed on integer-pel-unit pixels which are symmetrically located with respect to an interpolation location.

Further, if an asymmetric odd-number-tap interpolation filter is selected in operation 81, in operation 83, filtering may be performed on an odd number of integer-pel-unit pixels located with respect to an interpolation location by using an odd number of filter coefficients of the asymmetric odd-number-tap interpolation filter. If a symmetric even-number-tap interpolation filter is selected in operation 81, in operation 83, filtering may be performed on an even number of integer-pel-unit pixels located with respect to an interpolation location by using an even number of filter coefficients of the symmetric even-number-tap interpolation filter.

Various examples of respective filter coefficients of a symmetric interpolation filter and an asymmetric interpolation filter which is selectively determined based on a sub-pel-unit interpolation location will now be described with reference to FIGS. 9A through 12B.

According to the above-described principles, the interpolation filter illustrated in FIGS. 9A through 12B is a filter obtained by combining a sub-pel-unit interpolation filter using transformation and inverse transformation based on a plurality of basis functions with a window filter for smoothing high-frequency components, and includes filter coefficients of which a window size and a smoothness are adjusted to minimize distortion in an interpolation result. Also, various symmetric and asymmetric interpolation filters and odd- and even-number-tap interpolation filters will be described below.

Because the interpolation filter is a mirror-reflective symmetric filter, a filter coefficient $f_m(1-\alpha)$ of an interpolation location ($1-\alpha$) may be determined by using a filter coefficient $f_m(\alpha)$ of an interpolation location $\alpha$. Accordingly, in the tables shown in FIGS. 9A through 12B, although only interpolation filter coefficients $\{f_m(\alpha)\}$ in a case when a sub-pel unit of a motion vector MV is equal to or less than ½ are shown, it will be understood by one of ordinary skill in the art that other interpolation filter coefficients $\{f_m(\alpha)\}$ in a case when the sub-pel unit of the motion vector MV is greater than ½ may be determined.

Initially, in the tables shown in FIGS. 9A through 11C, 'FracMV' in the first column represents a sub-pel unit of a motion vector MV for $½^p$-pel-unit motion compensation. In order to perform sub-pel-unit interpolation filtering, a value of 'FracMV' may be combined with filter coefficients in the second column. An interpolation location $\alpha$ in the third column is a parameter for defining a sub-pel-unit interpolation location and may represent a phase shift amount from an integer-pel unit. A window filter size N in the fourth column may not necessarily be an integer. Scaling bits of the interpolation filter is 6 bits.

FIGS. 9A, 9B, 9C, and 9D respectively show filter coefficients of 3-tap through 6-tap interpolation filters which are determined based on an interpolation location and a window filter size, according to exemplary embodiments.

FIG. 9A shows an asymmetric interpolation filter that is a 3-tap interpolation filter and includes filter coefficients $\{p_{-1}, p_0, p_1\}$. Accordingly, the interpolation filter shown in FIG. 9A may perform interpolation filtering on integer-pel-unit pixels which are asymmetrically located with respect to an interpolation location. For example, if horizontal interpolation is performed, interpolation filtering may be performed on two left integer-pel-unit reference pixels and one right integer-pel-unit reference pixel with respect to an interpolation location.

FIG. 9B shows a symmetric interpolation filter that is a 4-tap interpolation filter and includes filter coefficients $\{p_{-1}, p_0, p_1, p_2\}$. Accordingly, the interpolation filter shown in FIG. 9B may perform interpolation filtering on integer-pel-unit pixels which are symmetrically located with respect to an interpolation location. For example, if horizontal interpolation is performed, interpolation filtering may be performed by using two left integer-pel-unit reference pixels and two right integer-pel-unit reference pixels with respect to an interpolation location.

FIG. 9C shows an asymmetric interpolation filter that is a 5-tap interpolation filter and includes filter coefficients $\{p_{-1}, p_0, p_1, p_2, p_3\}$. Accordingly, if horizontal interpolation is performed, interpolation filtering may be performed on two left integer-pel-unit reference pixels and three right integer-pel-unit reference pixels which are asymmetrically located with respect to an interpolation location.

FIG. 9D shows a symmetric interpolation filter that is a 6-tap interpolation filter and includes filter coefficients $\{p_{-2}, p_{-1}, p_0, p_1, p_2, p_3\}$. Accordingly, if horizontal interpolation is performed, interpolation filtering may be performed by using three left integer-pel-unit reference pixels and three right integer-pel-unit reference pixels which are symmetrically located with respect to an interpolation location.

FIGS. 10A, 10B, and 10C respectively show filter coefficients of 7-tap interpolation filters which are determined based on an interpolation location and a window filter size, according to exemplary embodiments.

FIG. 10A shows an asymmetric interpolation filter including filter coefficients $\{p_{-3}, p_{-2}, p_{-1}, p_0, p_1, p_2, p_3\}$. Accordingly, if horizontal interpolation is performed by using the interpolation filter shown in FIG. 10A, interpolation filtering may be performed on four left integer-pel-unit reference pixels and three right integer-pel-unit reference pixels which are asymmetrically located with respect to an interpolation location.

FIG. 10B shows an asymmetric interpolation filter including filter coefficients $\{p_{-2}, p_{-1}, p_0, p_1, p_2, p_3, p_4\}$. Accordingly, if horizontal interpolation is performed by using the interpolation filter shown in FIG. 10B, interpolation filtering may be performed on three left integer-pel-unit reference pixels and four right integer-pel-unit reference pixels which are asymmetrically located with respect to an interpolation location.

FIG. 10C shows an asymmetric interpolation filter including filter coefficients $\{p_{-1}, p_0, p_1, p_2, p_3, p_4, p_5\}$. Accordingly, if horizontal interpolation is performed by using the interpolation filter shown in FIG. 10C, interpolation filtering may be performed on two left integer-pel-unit reference pixels and five right integer-pel-unit reference pixels which are asymmetrically located with respect to an interpolation location.

FIGS. 11A, 11B, and 11C respectively show filter coefficients of 8-tap interpolation filters which are determined based on an interpolation location and a window filter size, according to exemplary embodiments.

FIG. 11A shows a symmetric interpolation filter including filter coefficients $\{p_{-3}, p_{-2}, p_{-1}, p_0, p_1, p_2, p_3, p_4\}$. Accordingly, if horizontal interpolation is performed by using the interpolation filter shown in FIG. 11A, interpolation filtering may be performed on four left integer-pel-unit reference pixels and four right integer-pel-unit reference pixels which are symmetrically located with respect to an interpolation location.

FIG. 11B shows an asymmetric interpolation filter including filter coefficients $\{p_{-2}, p_{-1}, p_0, p_1, p_2, p_3, p_4, p_5\}$. Accordingly, if horizontal interpolation is performed by using the interpolation filter shown in FIG. 11B, interpolation filtering may be performed on three left integer-pel-unit reference pixels and five right integer-pel-unit reference pixels which are asymmetrically located with respect to an interpolation location.

FIG. 11C shows an asymmetric interpolation filter including filter coefficients $\{p_{-4}, p_{-3}, p_{-2}, p_{-1}, p_0, p_1, p_2, p_3\}$. Accordingly, if horizontal interpolation is performed by using the interpolation filter shown in FIG. 11C, interpolation filtering may be performed on five left integer-pel-unit reference pixels and three right integer-pel-unit reference pixels which are asymmetrically located with respect to an interpolation location.

FIGS. 12A and 12B respectively show filter coefficients of a regularized luma interpolation filter and a regularized chroma interpolation filter, according to exemplary embodiments.

FIGS. 12A and 12B show filter coefficients of regularized interpolation filters selected to minimize a distortion region as described above in the "Regularized Interpolation Filter" section.

According to FIG. 12A, a window filter size N is adjusted in order to regularize a luma interpolation filter. From among various interpolation filters shown in FIG. 9A through 11C, a 7-tap interpolation filter $\{-1, 4, -10, 58, 17, -5, -1\}$ having a window size of 8.7 may be selected as a regularized luma interpolation filter for performing ¼-pel-unit interpolation filtering. In addition, an 8-tap interpolation filter $\{-1, 4, -11, 40, 40, -11, 4, -1\}$ having a window size of 9.5 may be selected as a regularized luma interpolation filter for performing ½-pel-unit interpolation filtering. In particular, an asymmetric interpolation filter may be selected as a regularized ¼-pel-unit luma interpolation filter, and a symmetric interpolation filter may be selected as a regularized ½-pel-unit luma interpolation filter.

According to FIG. 12B, a smoothness a is adjusted in order to regularize a chroma interpolation filter. A ⅛-pel-unit 4-tap symmetric interpolation filter may be selected as a regularized chroma interpolation filter.

Video encoding and decoding using an interpolation filter, according to exemplary embodiments, are described below with reference to FIGS. 13A through 27. Video encoding and decoding based on coding units having a tree structure, according to exemplary embodiments, are described below with reference to FIGS. 15 through 25. Video encoding and decoding methods using an interpolation filter, according to exemplary embodiments, are described below with reference to FIGS. 26 and 27.

When various operations are performed on image data, the image data may be split into data groups, and the same operation may be performed on data of the same data group. In the following description, a data group formed according to a predetermined standard is referred to as a 'data unit', and an operation is performed on each 'data unit' by using data included in the data unit.

Video Encoding and Decoding Using Interpolation Filter

FIG. 13A is a block diagram of a video encoding apparatus 100 which uses an interpolation filter, according to an exemplary embodiment.

Operations of an encoder 120 and an output unit (also referred to herein as an "output component") 130 of the video encoding apparatus 100 may be cooperatively controlled by any one or more of a video encoding processor, a CPU, and a graphic processor.

In order to encode a current picture of an input video, the video encoding apparatus 100 splits the current picture into data units having a predetermined size and encodes each data unit.

For example, the current picture may include pixels in a spatial domain. In order to encode spatially adjacent pixels of the current picture at the same time, the current picture may be split into pixel groups having a predetermined size in such a way that adjacent pixels within a predetermined range form one group. By performing a series of encoding operations on pixels of the split pixel groups, the current picture may be encoded.

Because initial data of a picture to be encoded are pixel values in the spatial domain, each pixel group may be used as a data unit to be encoded. Further, when transformation coefficients in a transformation domain are generated by performing transformation for video encoding on pixel values of the pixel group in the spatial domain, the transformation coefficients are included in coefficient groups having the same size as the pixel groups in the spatial domain. Accordingly, a coefficient group of the transformation coefficients in the transformation domain may also be used as a data unit for encoding a picture.

Accordingly, in the spatial domain and the transformation domain, a data group having a predetermined size may be used as a data unit to be encoded. In this case, the size of a data unit may be defined as the number of pieces of data included in the data unit. For example, the number of pixels in the spatial domain or the number of transformation coefficients in the transformation domain may represent the size of a data unit.

An encoding method or encoding characteristics of a current data unit may be determined with respect to each data group of any data level from among a data unit, a slice, a picture, and a picture sequence of a video to be currently encoded.

The video encoding apparatus 100 may encode the current picture by performing prediction encoding including any one or more of inter prediction and intra prediction, transformation, quantization, and entropy encoding on each data unit.

According to inter prediction, in order to estimate a current pixel value with reference to a pixel value of a temporally previous or subsequent picture, residual data between a pixel value of a reference region of a reference picture and a pixel value of a current picture, and reference data indicating the referred to pixel value may be determined.

In order to more accurately perform inter prediction, the video encoding apparatus 100 may determine the residual data and the reference data by using a sub-pel-unit pixel value. In order to perform sub-pel-unit inter prediction, the video encoding apparatus 100 may determine a sub-pel-unit pixel value located between adjacent integer-pel-unit pixels by interpolating the adjacent integer-pel-unit pixels.

Further, the sub-pel-unit pixel value may be generated by performing interpolation filtering on two or more integer-pel-unit reference pixels, including the adjacent integer-pel-unit pixels. The reference pixels for performing interpolation filtering may include pixels of a reference picture.

In order to efficiently perform image interpolation, the video encoding apparatus 100 may selectively determine interpolation filter coefficients. The encoder 120 may include the image interpolation apparatus 10 illustrated in FIG. 1. In particular, in order to perform sub-pel-unit inter prediction, the encoder 120 may generate a sub-pel-unit pixel value by using an interpolation filter including filter coefficients determined by the image interpolation apparatus 10 based on transformation and inverse transformation.

In order to efficiently perform interpolation filtering, the video encoding apparatus 100 may previously store interpolation filter coefficients in memory. According to an interpolation location, a smoothness, the number of filter taps, a bit depth, a scaling ratio, a basis function of interpolation filtering based on transformation, a window function, and a window size, various interpolation filter coefficients may be stored in memory of the video encoding apparatus 100.

For example, i) a ¼-pel-unit interpolation filter including 7-tap filter coefficients {−1, 4, −10, 58, 17, −5, 1} and having a window size of 8.7, and ii) a ½-pel-unit interpolation filter including 8-tap filter coefficients {−1, 4, −11, 40, 40, −11, 4, −1} and having a window size of 9.5 may be stored in memory, and may be used to perform interpolation filtering.

In addition to the above-mentioned interpolation filter coefficients, interpolation filter coefficients which are modifiable according to various basis functions and window functions as shown in FIGS. 9A through 12B may be used to perform interpolation filtering.

If interpolation filtering is performed by using the filter coefficients stored in memory, a calculation speed of inter prediction may be improved.

From among a plurality of interpolation filters, the encoder 120 may select and use a symmetric interpolation filter or an asymmetric interpolation filter to perform inter prediction based on a sub-pel-unit interpolation location α. In addition, an interpolation filter which is appropriate for a current pixel may be determined based on any one or more of the number of filter taps, a bit depth, a scaling ratio, a window filter size, a smoothness, etc.

The encoder 120 may determine an interpolation filter based on image characteristics. For example, the encoder 120 may determine different interpolation filters based on respective color components of pixels. For example, an interpolation filter for luma pixels and an interpolation filter for chroma pixels may be separately selected, and thus, sub-pel-unit pixel values may be individually generated by performing interpolation filtering.

A video may be encoded by performing inter prediction based on any one or more of sub-pel-unit interpolation, intra prediction, transformation, and quantization.

The output unit 130 may encode and output encoding information and may output encoded picture data. As the encoding information, information which relates to the selected interpolation filter may be additionally encoded. In particular, information about an interpolation filter which is used to perform sub-pel-unit prediction encoding may be encoded. For example, a decoder must know about an interpolation filter used to encode an image in order to decode the image by using the same interpolation filter used in the encoding process. For this, information indicating the used interpolation filter may be encoded together with the image. However, if a filter is selected based on a previous encoding result, i.e., context, information about the selected filter may not be additionally encoded.

The output unit 130 may perform entropy encoding on encoding information and encoded picture data, and may output a bitstream.

FIG. 13B is a block diagram of a video decoding apparatus 200 which uses an interpolation filter, according to an exemplary embodiment.

The video decoding apparatus 200 includes a receiver and extractor 220 and a decoder 230. Operations of the receiver and extractor 220 and the decoder 230 of the video decoding apparatus 200 may be cooperatively controlled by any one or more of a video decoding processor, a graphic processor, and a CPU.

In order to restore an image from a bitstream, the video decoding apparatus 200 may decode encoded picture data of the bitstream by performing operations including any one or more of entropy decoding, inverse quantization, inverse transformation, inter prediction/compensation, and intra prediction/compensation.

The receiver and extractor 220 receives and parses a bitstream of an encoded video. The receiver and extractor 220 may extract encoded data of each data unit of a current picture, and encoding information which includes information about an encoding method to be used to decode the encoded data, from the parsed bitstream.

If the encoding information includes interpolation filter information, the decoder 230 may read information about an interpolation filter which has been used to perform sub-pel-unit intra prediction from the interpolation filter information, and may perform motion compensation by using the interpolation filter used in an encoding process.

The decoder 230 may decode encoded picture data by performing various decoding operations such as any one or more of entropy decoding, inverse quantization, inverse transformation, inter prediction/compensation, and intra prediction/compensation on an encoded picture according to various decoding methods which are determined based on information about a coding mode.

In order to perform motion compensation, a reference region of a reference picture that is temporally previous or subsequent to a current picture may be determined by using reference data, and a pixel value of the reference region and residual data may be combined in order to restore a current pixel value.

If the residual data and the reference data are determined based on pixels interpolated in a sub-pel unit in an encoding process, the decoder 230 may also perform motion compensation based on pixels interpolated in a sub-pel unit. In order to perform sub-pel-unit motion compensation, the decoder 230 may generate a sub-pel-unit pixel value by interpolating adjacent integer-pel-unit pixels of the reference picture. The sub-pel-unit pixel value may be generated by performing interpolation filtering on two or more integer-pel-unit reference pixels including the adjacent integer-pel-unit pixels.

In order to efficiently perform image interpolation, the video decoding apparatus 200 may selectively determine interpolation filter coefficients. The decoder 230 may include the image interpolation apparatus 10 illustrated in FIG. 1. In particular, in order to perform sub-pel-unit motion compensation, the decoder 230 may generate a sub-pel-unit pixel value by using an interpolation filter based on transformation.

In order to efficiently perform interpolation filtering, the video decoding apparatus 200 may previously store variously selectable interpolation filter coefficients in memory based on any one or more of an interpolation location, a smoothness, the number of filter taps, a bit depth, a scaling ratio, and a basis function of interpolation filtering based on transformation.

As described above, for example, at least one of i) a ¼-pel-unit interpolation filter including 7-tap filter coefficients {−1, 4, −10, 58, 17, −5, 1} and having a window size of 8.7, and ii) a ½-pel-unit interpolation filter including 8-tap filter coefficients {−1, 4, −11, 40, 40, −11, 4, −1} and having a window size of 9.5 may be stored in memory and may be used to perform interpolation filtering. In addition to the above-mentioned interpolation filter coefficients, interpolation filter coefficients which are modifiable based on any one or more of various basis functions and window functions as shown in FIGS. 9A through 12B may be used to perform interpolation filtering.

From among a plurality of interpolation filters, the decoder 230 may select and use an interpolation filter which is appropriate for a current pixel in order to perform sub-pel-unit motion compensation based on any one or more of a sub-pel-unit interpolation location α, the number of filter taps, a bit depth, a scaling ratio, etc.

Further, the decoder 230 may determine an interpolation filter based on image characteristics. For example, different interpolation filters may be determined based on color components of pixels, interpolation filtering for luma pixels and interpolation filtering for chroma pixels may be separately performed, and thus interpolated sub-pel-unit pixel values may be individually generated.

Accordingly, the decoder 230 may restore data in a spatial domain by performing inverse quantization/inverse transformation, and may restore pixel values and a current picture by performing intra prediction and motion compensation based on sub-pel-unit interpolation and/or by performing integer-pel-unit interpolation. If pictures are restored, a video may be decoded.

Figure 14A:
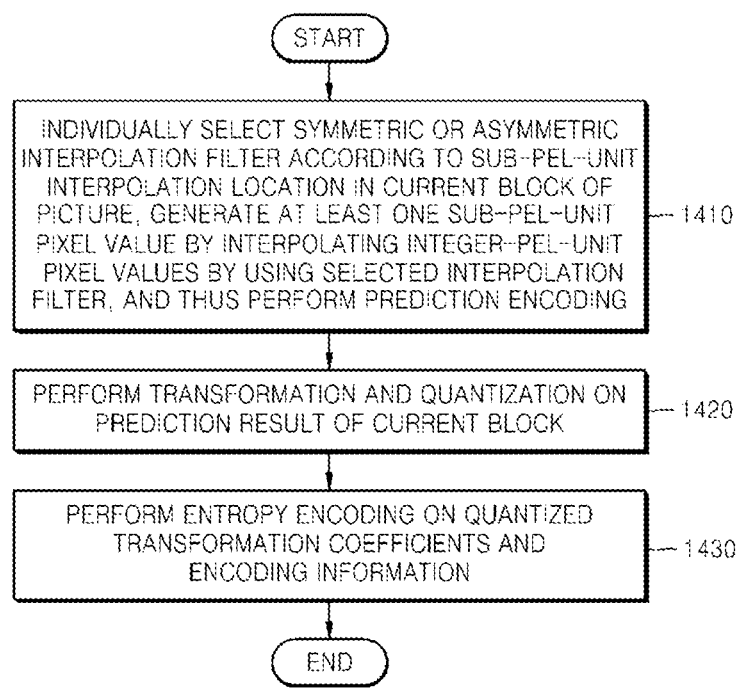
FIG. 14A is a flowchart which illustrates an image encoding method using an interpolation filter, according to an exemplary embodiment.

FIG. 14A is a flowchart which illustrates an image encoding method using an interpolation filter, according to an exemplary embodiment.

In operation 1410, in order to encode a current picture of an input video, prediction encoding using sub-pel-unit interpolation is performed. From among a plurality of interpolation filters which are configured for generating a sub-pel-unit pixel value, an interpolation filter is variably selected based on a sub-pel-unit interpolation location and a smoothness. The smoothness of the interpolation filter may be determined based on the distance between an interpolation location and integer-pel units.

The sub-pel-unit pixel value may be generated by performing interpolation filtering on two or more integer-pel-unit reference pixels of a reference picture. Residual data and reference data are determined by using the generated sub-pel-unit pixel value, thereby performing prediction encoding.

In order to efficiently perform image interpolation, interpolation filter coefficients may be selectively determined. Memory may store interpolation filter coefficients of symmetric and asymmetric interpolation filters, odd- and even-number-tap interpolation filters, and regularized interpolation filters. From among the interpolation filter coefficients previously stored in memory, a desired interpolation filter may be selected based on any one or more of a sub-pel-unit interpolation location, a smoothness, the number of filter taps, a bit depth, a scaling ratio, a basis function of interpolation filtering based on transformation, a window filter size, and a color component, and interpolation may be performed in order to generate the sub-pel-unit pixel value.

In operation 1420, transformation and quantization are performed on an inter prediction result based on sub-pel-unit interpolation, and intra prediction.

In operation 1430, a bitstream may be output by performing entropy encoding on encoding information and encoded picture data in the form of quantized transformation coefficients. The encoding information may include information about an interpolation filter used to perform sub-pel-unit prediction encoding.

Figure 14B:
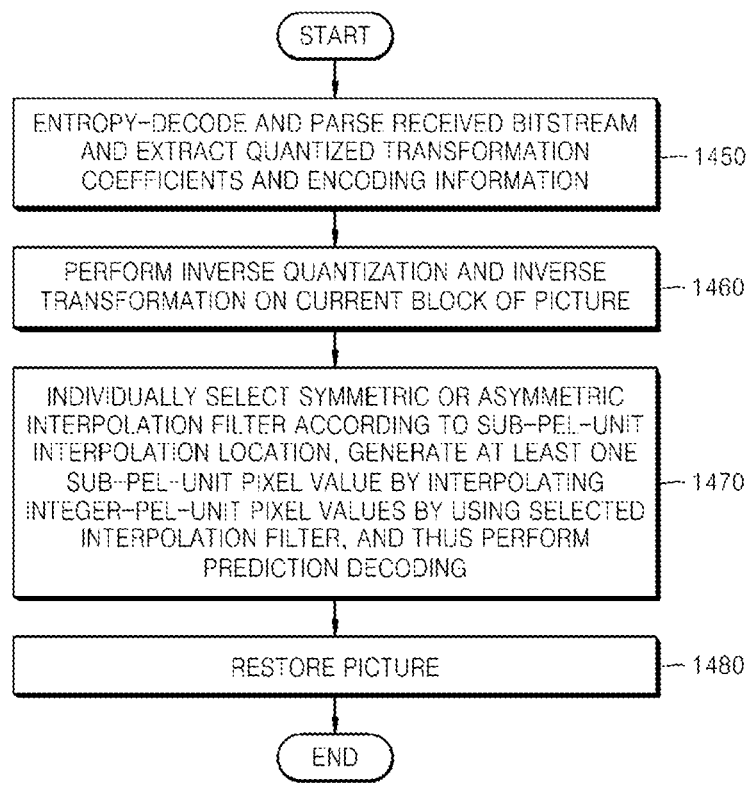
FIG. 14B is a flowchart which illustrates an image decoding method using an interpolation filter, according to an exemplary embodiment.

FIG. 14B is a flowchart which illustrates an image decoding method using an interpolation filter, according to an exemplary embodiment.

In operation 1450, a bitstream of an encoded video is received, entropy-decoded, and parsed in order to extract quantized transformation coefficients and encoding information of a current picture from the bitstream.

If the encoding information includes information about an interpolation filter, the type of a required interpolation filter may be read from the information.

In operation 1460, based on any one or more of various decoding methods which are determined based on a coding mode read from the encoding information, inverse quantization and inverse transformation are performed on the quantized transformation coefficients, and residual data is added, thereby restoring data in a spatial domain.

In operation 1470, encoded picture data may be decoded by performing any one or more of various decoding operations such as motion compensation and intra prediction based on the coding mode.

In particular, if encoded residual data and reference data are extracted based on pixels interpolated in a sub-pel unit, motion compensation may be performed based on the pixels interpolated in a sub-pel unit. From among a plurality of interpolation filters which are configured for generating a sub-pel-unit pixel value, an interpolation filter is variably selected based on a sub-pel-unit interpolation location and a smoothness.

In order to efficiently perform image interpolation, interpolation filter coefficients may be selectively determined. Memory may store respective interpolation filter coefficients of symmetric interpolation filters and asymmetric interpolation filters, odd- and even-number-tap interpolation filters, and regularized interpolation filters. From among the interpolation filter coefficients previously stored in memory, a desired interpolation filter may be selected based on any one or more of a sub-pel-unit interpolation location, a smoothness, the number of filter taps, a bit depth, a scaling ratio, a basis function of interpolation filtering based on transformation, a window filter size, and a color component, and interpolation may be performed in order to generate the sub-pel-unit pixel value.

Because motion compensation is performed on pixels which are interpolated by using the interpolation filter coefficients previously stored in memory, a calculation speed may be increased. Memory may store symmetric and asymmetric interpolation filters, and odd- and even-number-tap interpolation filters.

A reference picture and a reference region are determined by using the reference data, and the sub-pel-unit pixel value may be generated by performing interpolation filtering on two or more integer-pel-unit reference pixels of the reference picture. Motion compensation may be performed by combining the generated sub-pel-unit pixel value with the residual data, and thus prediction decoding may be performed.

In operation 1480, a current picture is restored by using pixel values obtained by performing prediction decoding, and thus a video is decoded.

Video Encoding and Decoding Using Interpolation Based on Coding Units Having Tree Structure Video encoding and decoding apparatuses which use an interpolation filter based on coding units having a tree structure, and video encoding and decoding methods corresponding to the video encoding and decoding apparatuses, according to exemplary embodiments, will now be described in detail with reference to FIGS. 13 through 27.

The video encoding apparatus 100 may encode a video based on coding units and transformation units having a tree structure.

A current picture of a video may be split based on a maximum coding unit for the current picture. If the current picture is larger than the maximum coding unit, image data of the current picture may be split into at least one maximum coding unit. The maximum coding unit may be a data unit having a size of, for example, any one of 32×32, 64×64, 128×128, 256×256, etc., wherein a shape of the data unit is a square having a width and length in squares of 2. The encoder 120 may encode picture data of each of at least one maximum coding unit.

A coding unit according to an exemplary embodiment may be characterized by a maximum size and a depth. The depth denotes a number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Because a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units based on a maximum size of the coding unit, and each of the maximum coding units may include deeper coding units that are split according to depths. Because the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The encoder 120 encodes at least one split region obtained by splitting a region of the maximum coding unit according to depths, and determines a depth to output finally encoded image data according to the at least one split region. In particular, the encoder 120 determines a coded depth by encoding the image data in the deeper coding units according to depths, based on the maximum coding unit of the current picture, and selecting a depth having the least encoding error.

The encoder 120 may output the encoded image data of the coding unit corresponding to the determined coded depth. Further, the encoder 120 may transmit information about the determined coded depth to the output unit 130 such that the information about the coded depth may be encoded as encoding information.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the encoder 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basic unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetric partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a transformation unit having a size smaller than or equal to the coding unit. For example, the transformation unit for the transformation may include a data unit for an intra mode and a data unit for an inter mode.

Similarly to the coding unit, the transformation unit in the coding unit may be recursively split into smaller sized regions, so that the transformation unit may be determined independently in units of regions. Thus, residual data in the coding unit may be divided according to the transformation units having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is N/2×N/2. In other words, transformation units having a tree structure may be set according to transformation depths.

Encoding information according to a coded depth requires not only information about the coded depth, but also information about prediction encoding and transformation. Accordingly, the encoder 120 not only determines a coded depth having a least encoding error, but also determines a partition type in a prediction unit, a prediction mode according to prediction units, and a size of a transformation unit for transformation. For inter prediction, the encoding information according to a coded depth may include information related to interpolation filtering for interpolating sub-pel units.

Also, the encoder 120 may perform transformation by using transformation units having a tree structure to encode coding units, based on a maximum split level of the transformation units, which is previously and restrictively set in each maximum coding unit or a current coding unit.

In each of deeper coding units according to depths, a basic transformation unit having a size smaller than or equal to a coding unit may be hierarchically split into transformation units of lower transformation depths. Transformation units having a tree structure may include a basic transformation unit having a maximum size that is currently allowed, and lower-level transformation units relative to a maximum split level that is allowed for coding units.

After performing transformation in each level according to a transformation depth in a current coding unit, the encoder 120 may determine transformation units having a tree structure, which are independent from transformation units of adjacent regions and form a hierarchical structure between transformation units in the same region according to transformation depths.

In other words, transformation units having a tree structure may be determined by performing transformation on each coding unit by using various-sized transformation units and then comparing results of transformation. While a coding unit is being determined, a transformation unit for transforming the coding unit may be determined. Whenever coding units according to each of one or more depths are encoded, transformation units according to each of one or more transformation depths may be used to perform transformation.

A transformation unit having a least encoding error has to be determined for each coding unit. In order to determine a transformation depth having a minimum encoding error in a transformation unit, encoding errors may be measured and compared in all deeper transformation units according to depths. A transformation unit may be determined as a data unit for minimizing a transformation error of a coding unit.

Accordingly, since a combination of a deeper coding unit and a deeper transformation unit according to depths, which has a least encoding error, is individually determined in each region of a maximum coding unit, coding units having a tree structure and transformation units having a tree structure may be determined.

Methods of determining coding units having a tree structure, partitions, and transformation units having a tree structure in a maximum coding unit, according to exemplary embodiments, will be described in detail later with reference to FIGS. 15 through 25.

The encoder 120 may measure an encoding error of deeper coding units according to depths by using rate-distortion optimization based on Lagrangian multipliers.

The video encoding apparatus 100 may output the image data of the maximum coding unit, which is encoded based on the at least one coded depth determined by the encoder 120, and information about a coding mode according to the coded depth, which is encoded by the output unit 130, in the form of a bitstream.

The information about the coding mode of deeper coding units according to depths, which is determined as a picture is encoded based on coding units, prediction units, and transformation units having a tree structure, may be included in a header, a sequence parameter set (SPS), or a picture parameter set (PPS) of a bitstream.

The encoded image data may be obtained by encoding residual data of an image.

The information about the coding mode according to the coded depth may include information about the coded depth, about the partition type in the prediction unit, the prediction mode, and the size of the transformation unit.

The information about the coded depth may be defined by using split information according to depths, which represents whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one coding mode is determined for a coding unit of a coded depth, information about at least one coding mode may be determined for one maximum coding unit. Also, a coded depth of the image data of the maximum coding unit may be different according to locations since the image data is hierarchically split according to depths, and thus information about the coded depth and the coding mode may be set for the image data.

Accordingly, the output unit 130 may assign encoding information about a corresponding coded depth and a coding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header, an SPS, or a PPS of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum coding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The output unit 130 may encode and output encoding information indicating an encoding method used to encode a video based on coding units having a tree structure and transformation units having a tree structure. The encoding information may include information about various coding modes of coding units corresponding to a coded depth, and information about the coded depth.

Definitions of various terms, such as a coding unit, a depth, a prediction unit, a transformation unit, and information about various coding modes, for various operations of the video decoding apparatus 200 are identical to those described with reference to the video encoding apparatus 100.

The receiver 210 receives a bitstream of an encoded video. The receiver and extractor 220 parses the received bitstream. The receiver and extractor 220 extracts encoded picture data for each coding unit from the parsed bitstream, wherein the coding units have a tree structure according to each maximum coding unit, and outputs the extracted picture data to the decoder 230. The receiver and extractor 220 may extract information about a maximum size of a coding unit of a current picture, from a header, an SPS, or a PPS about the current picture.

Also, the receiver and extractor 220 may extract encoding information about the coding units having a tree structure according to each maximum coding unit, from the parsed bitstream. Information about a coded depth and a coding mode is extracted from the encoding information. The extracted information about the coded depth and the coding mode is output to the decoder 230. In other words, the image data in a bitstream may be split into the maximum coding unit so that the decoder 230 may decode the image data for each maximum coding unit.

The information about the coded depth and the coding mode according to the maximum coding unit may be set for information about at least one coding unit corresponding to the coded depth, and information about a coding mode may include information about a partition type of a corresponding coding unit corresponding to the coded depth, about a prediction mode, and a size of a transformation unit. For inter prediction, information related to interpolation filtering for interpolating sub-pel units may be extracted from the encoding information according to a coded depth. Also, splitting information according to depths may be extracted as the information about the coded depth.

The information about the coded depth and the coding mode according to each maximum coding unit extracted by the receiver and extractor 220 is information about a coded depth and a coding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and a coding mode that generates the minimum encoding error.

Since encoding information about the coded depth and the coding mode may be assigned to a predetermined data unit from among a corresponding coding unit, a prediction unit, and a minimum unit, the receiver and extractor 220 may extract the information about the coded depth and the coding mode according to the predetermined data units. The predetermined data units to which the same information about the coded depth and the coding mode is assigned may be inferred to be the data units included in the same maximum coding unit.

The decoder 230 may determine at least one coded depth of a current maximum coding unit by using split information according to depths. If the split information represents that image data is no longer split in the current depth, the current depth is a coded depth. Accordingly, the decoder 230 may decode encoded picture data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 230 in the same coding mode.

The decoder 230 may restore the current picture by decoding the encoded picture data in each maximum coding unit based on the information about the coded depth and the coding mode according to the maximum coding units. The partition type, the prediction mode, and the transformation unit may be read as the coding mode for each coding unit from among the coding units having the tree structure included in each maximum coding unit. A decoding process may include a prediction including intra prediction and motion compensation, and an inverse transformation.

The decoder 230 may perform intra prediction or motion compensation according to a partition and a prediction mode of each coding unit, based on the information about the partition type and the prediction mode of the prediction unit of the coding units having a tree structure.

Also, the decoder 230 may read the structure of transformation units having a tree structure and may perform inverse transformation on each coding unit based on the transformation units.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined in consideration of resolution and an amount of image data.

Accordingly, even if image data has high resolution and a large amount of data, the image data may be efficiently decoded and restored by using a size of a coding unit and a coding mode, which are adaptively determined according to characteristics of the image data, by using information about an optimum coding mode received from an encoder.

Figure 15:
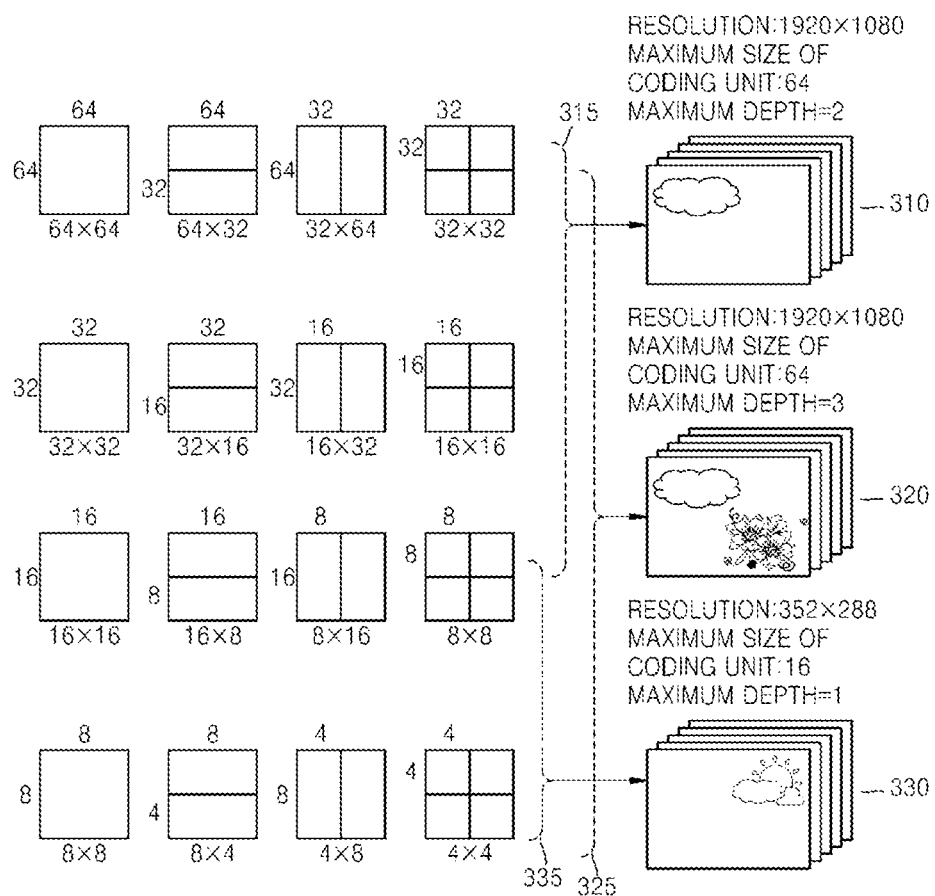
FIG. 15 is a diagram which illustrates a concept of coding units, according to an exemplary embodiment.

FIG. 15 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 15 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 16:
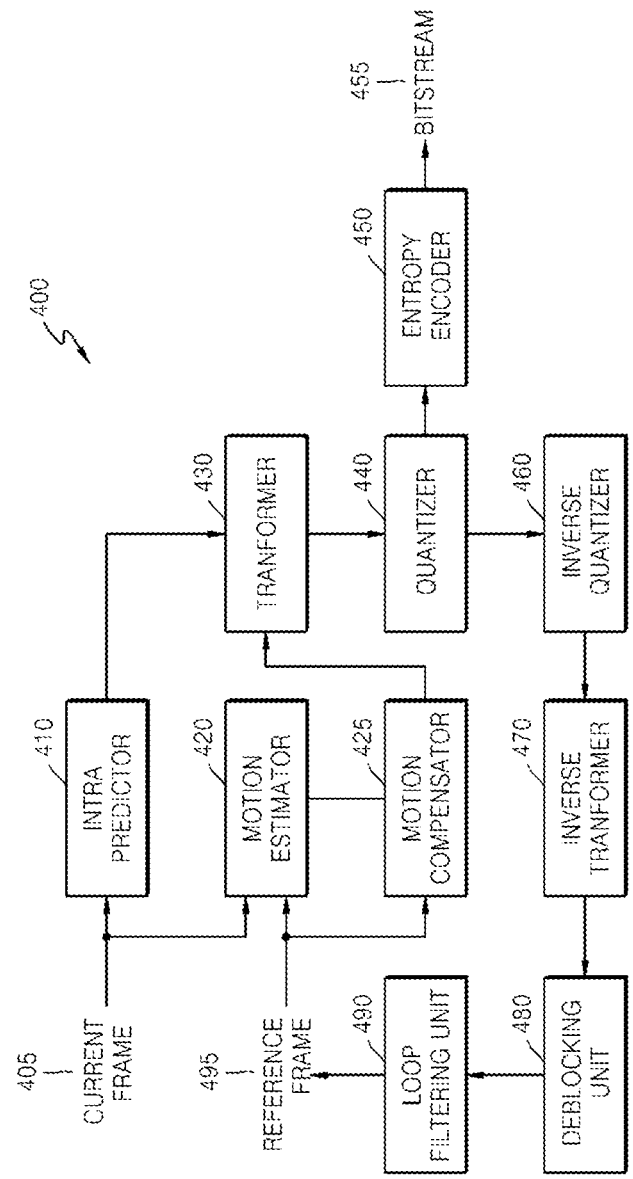
FIG. 16 is a block diagram of an image encoder based on coding units, according to an exemplary embodiment.

FIG. 16 is a block diagram of an image encoder 400 based on coding units, according to an exemplary embodiment.

The image encoder 400 performs operations of the encoder 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

In order to precisely perform motion estimation by using reference pixels in sub-pel units, the motion estimator 420 and the motion compensator 425 may generate pixels in sub-pel units by interpolating pixels in integer-pel units. An interpolation filter for generating pixels in sub-pel units may be the interpolation filter described above in relation to FIGS. 1 and 13A.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, have to perform operations based on each coding unit from among coding units having a tree structure while considering the maximum depth of each maximum coding unit.

Specifically, the intra predictor 410, the motion estimator 420, and the motion compensator 425 have to determine partitions and a prediction mode of each coding unit from among the coding units having a tree structure while considering the maximum size and the maximum depth of a current maximum coding unit, and the transformer 430 has to determine the size of the transformation unit in each coding unit from among the coding units having a tree structure.

Figure 17:
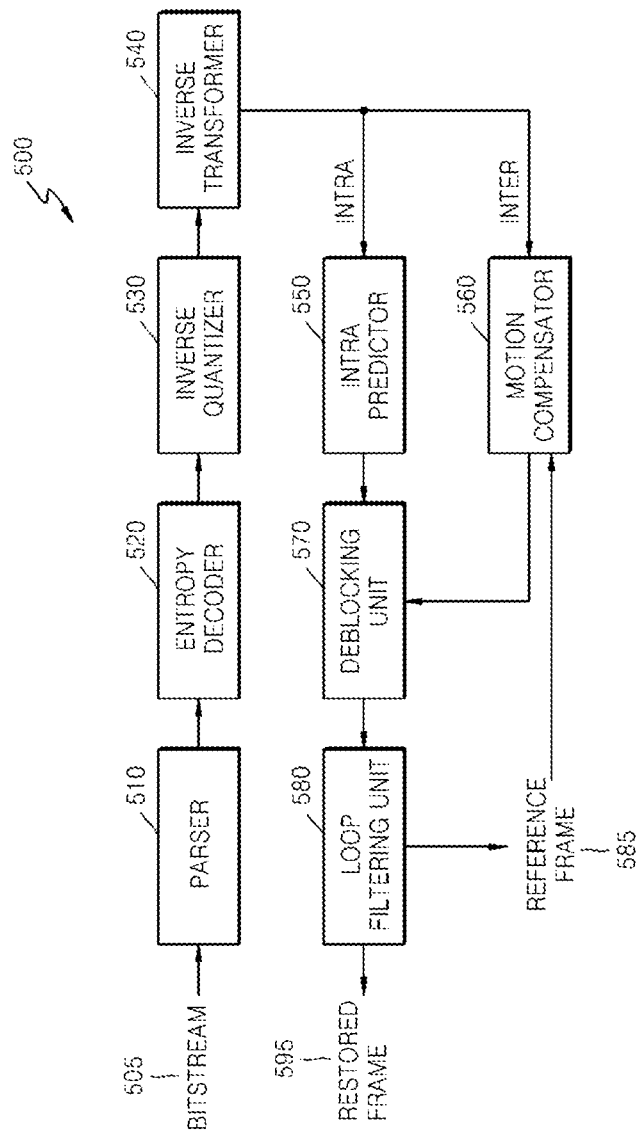
FIG. 17 is a block diagram of an image decoder based on coding units, according to an exemplary embodiment.

FIG. 17 is a block diagram of an image decoder 500 based on coding units, according to an exemplary embodiment.

A parser 510 parses encoded image data to be decoded and information about encoding required for decoding from a bitstream 505. The encoded image data is output as inversely quantized data through an entropy decoder 520 and an inverse quantizer 530, and the inversely quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

In order to precisely perform motion estimation by using reference pixels in sub-pel units, the motion compensator 560 may generate pixels in sub-pel units by interpolating pixels in integer-pel units. An interpolation filter for generating pixels in sub-pel units may be the interpolation filter described above in relation to FIGS. 2 and 13B.

The image data in the spatial domain, which passed through the intra predictor 550 and the motion compensator 560, may be output as a restored frame 595 after being post-processed through a deblocking unit (also referred to herein as a "deblocker") 570 and a loop filtering unit (also referred to herein as a "loop filter") 580. Also, the image data that is post-processed through the deblocking unit 570 and the loop filtering unit 580 may be output as the reference frame 585.

In order to decode the image data in the decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, have to perform operations based on coding units having a tree structure for each maximum coding unit.

Specifically, the intra predictor 550 and the motion compensator 560 have to determine partitions and a prediction mode for each of the coding units having a tree structure, and the inverse transformer 540 has to determine a size of a transformation unit for each coding unit.

Figure 18:
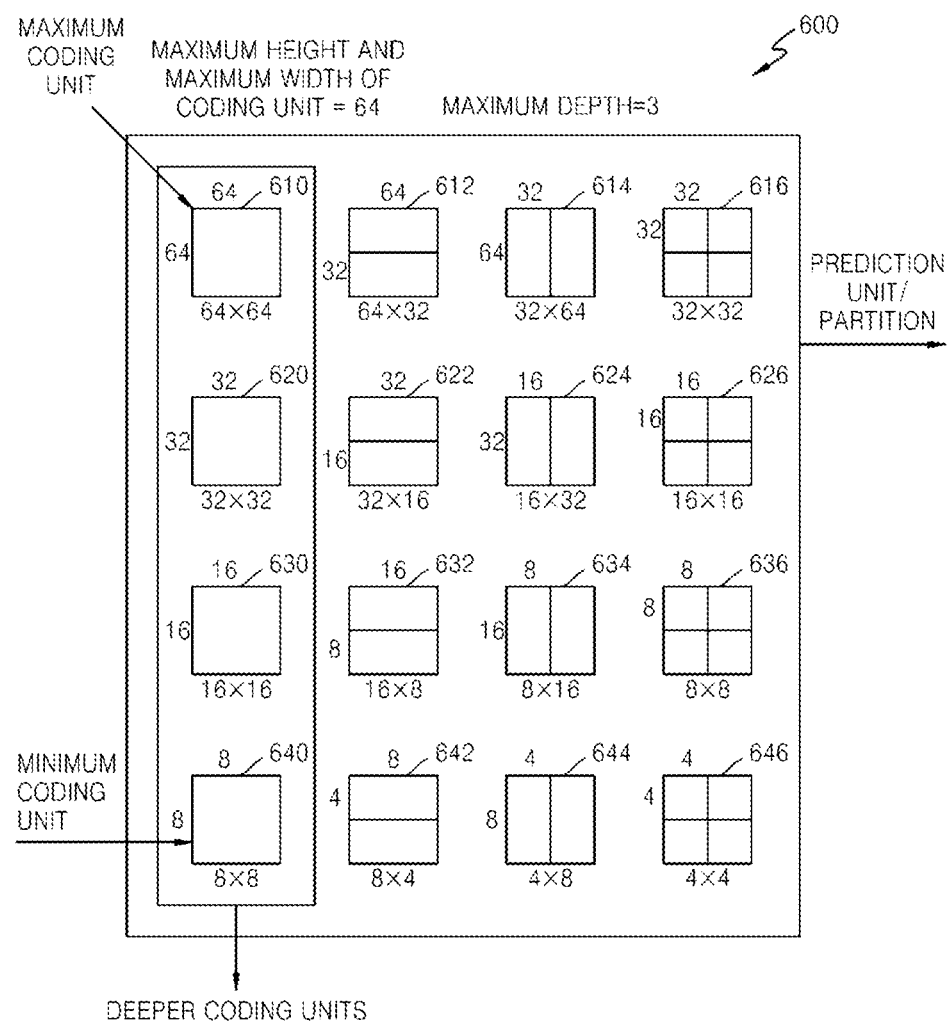
FIG. 18 is a diagram which illustrates deeper coding units according to depths and partitions, according to an exemplary embodiment.

FIG. 18 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth denotes the total number of times splitting is performed from a maximum coding unit to a minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, or partitions 626 having a size of 16×16.

Similarly, a prediction unit of the coding unit 630 having the size of 16×16 and the depth of 2 may be split into partitions included in the coding unit 630, i.e. a partition having a size of 16×16, partitions 632 having a size of 16×8, partitions 634 having a size of 8×16, or partitions 636 having a size of 8×8.

Similarly, a prediction unit of the coding unit 640 having the size of 8×8 and the depth of 3 may be split into partitions included in the coding unit 640, i.e. a partition having a size of 8×8, partitions 642 having a size of 8×4, partitions 644 having a size of 4×8, or partitions 646 having a size of 4×4.

In order to determine the at least one coded depth of the coding units constituting the maximum coding unit 610, the encoder 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 19:
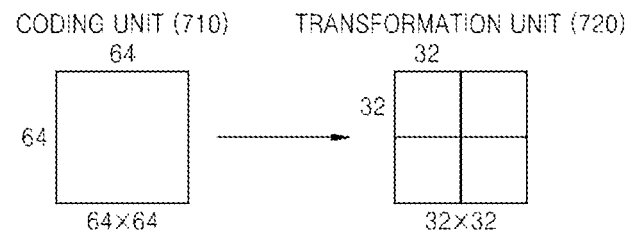
FIG. 19 is a diagram which illustrates a relationship between a coding unit and transformation units, according to an exemplary embodiment.

FIG. 19 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 20:
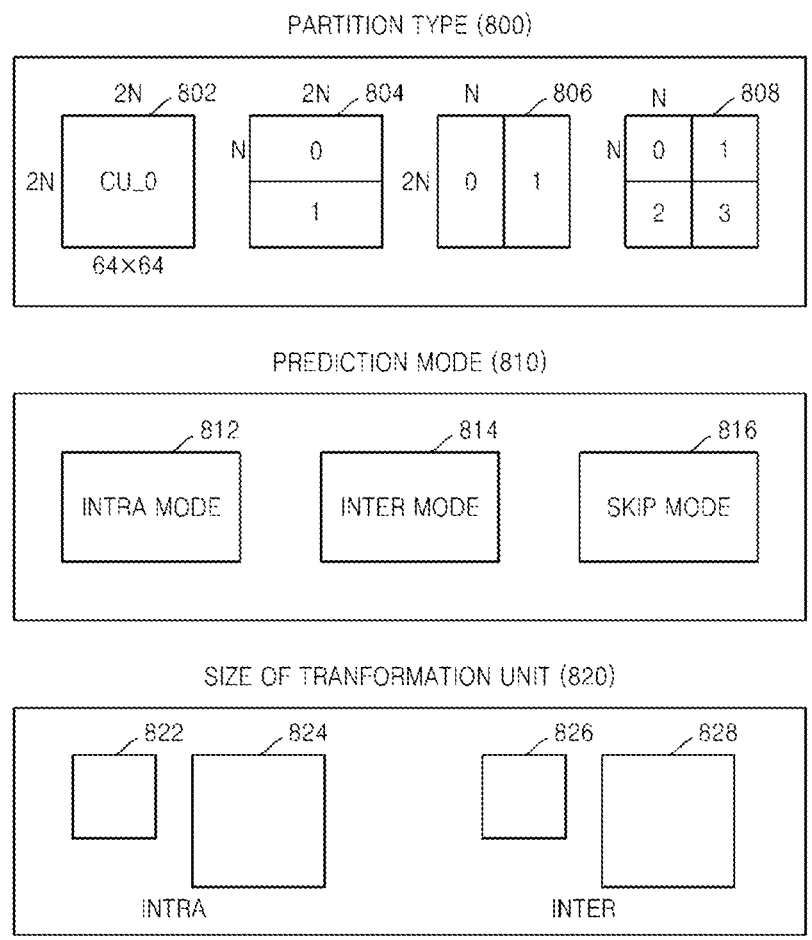
FIG. 20 is a diagram which illustrates encoding information of coding units which correspond to a coded depth, according to an exemplary embodiment.

FIG. 20 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about a coding mode.

The information 800 represents information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 represents a prediction mode of each partition. For example, the information 810 may indicate a mode of prediction encoding performed on a partition represented by the information 800, i.e., an intra mode 812, an inter mode 814, or a skip mode 816.

The information 820 represents a transformation unit to be based on when transformation is performed on a current coding unit. For example, the transformation unit may be a first intra transformation unit 822, a second intra transformation unit 824, a first inter transformation unit 826, or a second inter transformation unit 828.

Figure 21:
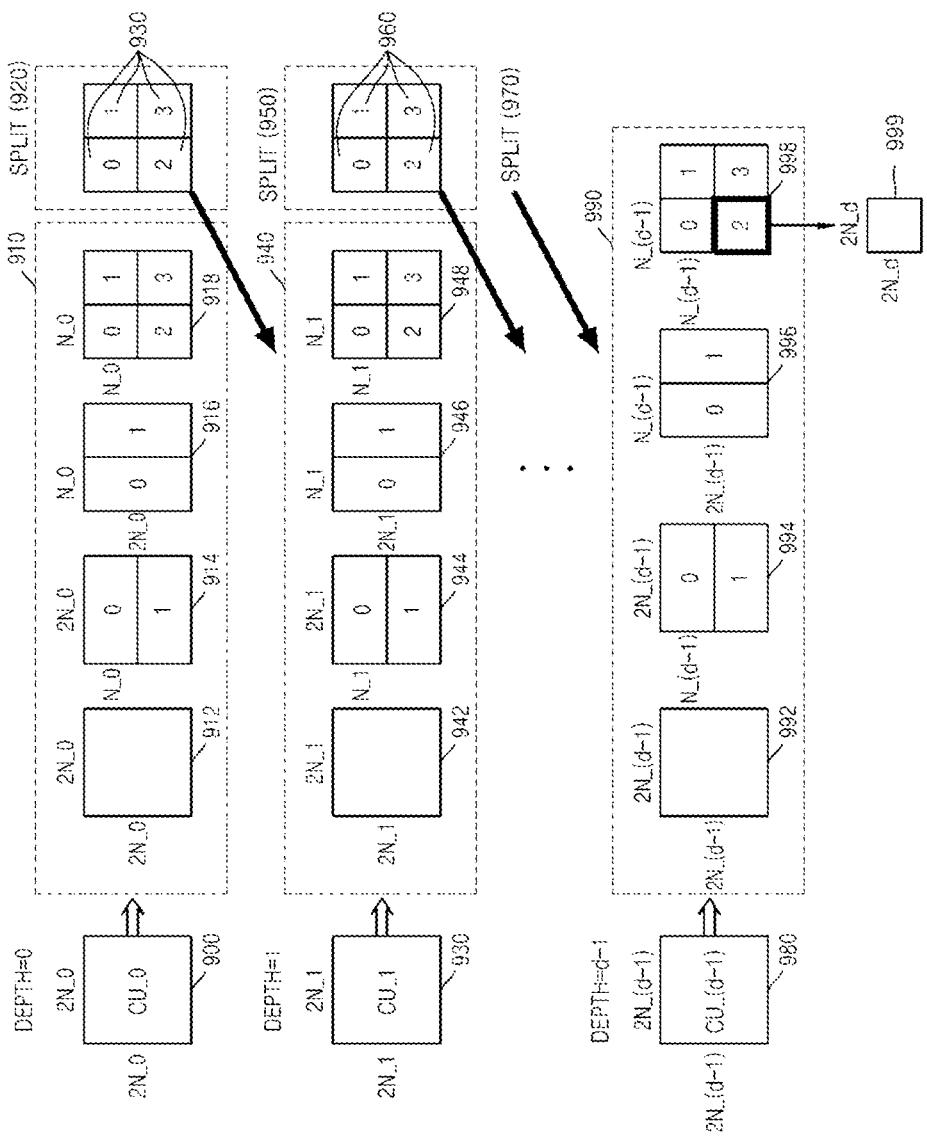
FIG. 21 is a diagram of deeper coding units according to depths, according to an exemplary embodiment.

The receiver and extractor 220 of the video decoding apparatus 200 may extract and use the information 800, 810, and 820 for decoding, according to each deeper coding unit FIG. 21 is a diagram of deeper coding units according to depths, according to an exemplary embodiment.

Split information may be used to indicate a change of a depth. The spilt information represents whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 21 only illustrates the partition types 912 through 918 which are obtained by symmetrically splitting the prediction unit 910, but a partition type is not limited thereto, and the partitions of the prediction unit 910 may include asymmetric partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0× N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, deeper coding units according to depths may be assigned up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 so as to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as a coding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about a coding mode. Also, since a coding unit is split from a depth of 0 to a coded depth, only split information of the coded depth is set to 0, and split information of depths excluding the coded depth is set to 1.

The receiver and extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about a coding mode of the corresponding depth for decoding.

Figure 22:
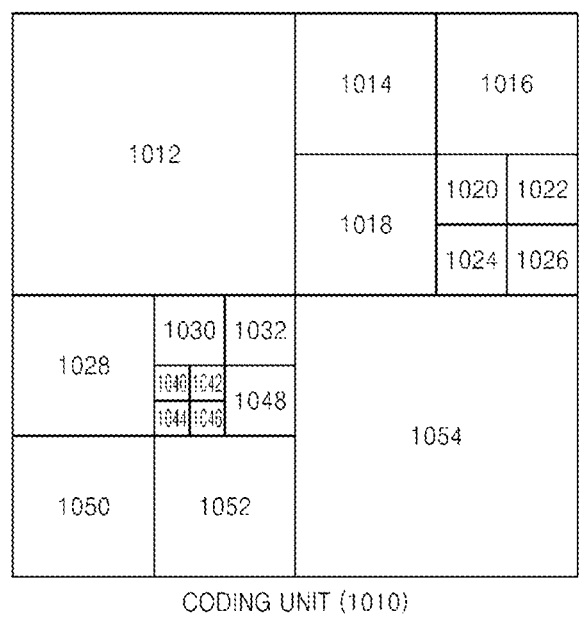
FIGS. 22, 23, and 24 are diagrams which illustrate a relationship between coding units, prediction units, and transformation units, according to an exemplary embodiment.
Figure 23:
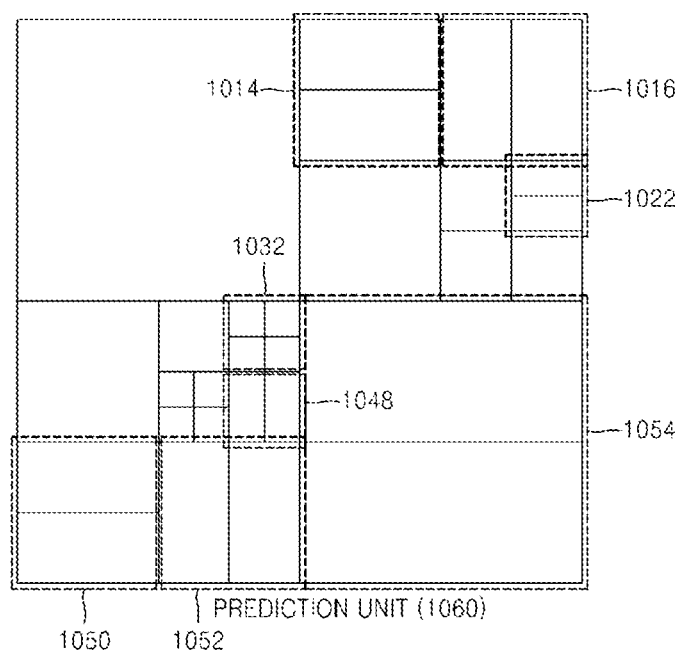
Figure 24:
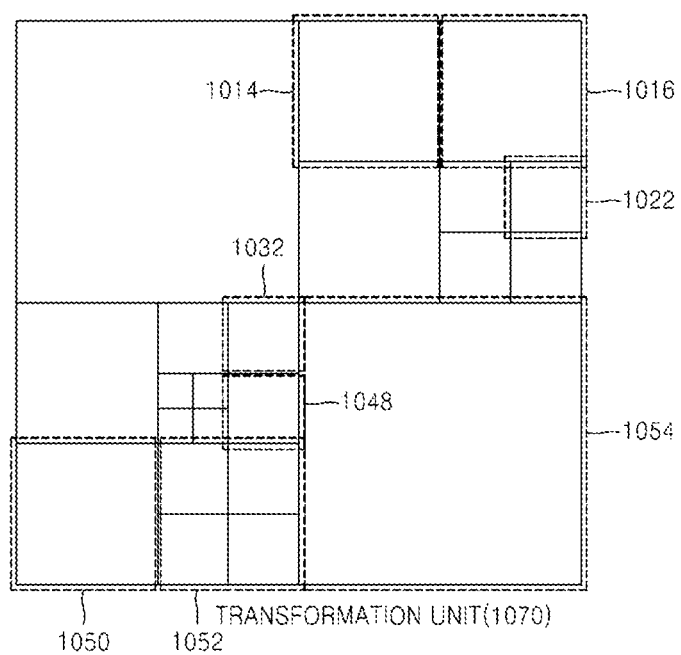

FIGS. 22, 23, and 24 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetric Partition Type | Asymmetric Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetric Partition Type) N/2 × N/2 (Asymmetric Partition Type) | Repeatedly Encode Coding Units having Lower Depth of d + 1 |

The output unit 130 of the video encoding apparatus 100 may output the encoding information about the coding units having a tree structure, and the receiver and extractor 220 of the video decoding apparatus 200 may extract the encoding information about the coding units having a tree structure from a received bitstream.

Split information represents whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetric partition types having sizes of 2N×2N, 2N×N, N×2N, and N×N, which are obtained by symmetrically splitting a height or a width of a prediction unit, and asymmetric partition types having sizes of 2N×nU, 2N×nD, nL×2N, and nR×2N, which are obtained by asymmetrically splitting the height or width of the prediction unit. The asymmetric partition types having the sizes of 2N×nU and 2N×nD may be respectively obtained by splitting the height of the prediction unit in 1:3 and 3:1, and the asymmetric partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetric partition type, a size of a transformation unit may be N×N, and if the partition type of the current coding unit is an asymmetric partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 25:
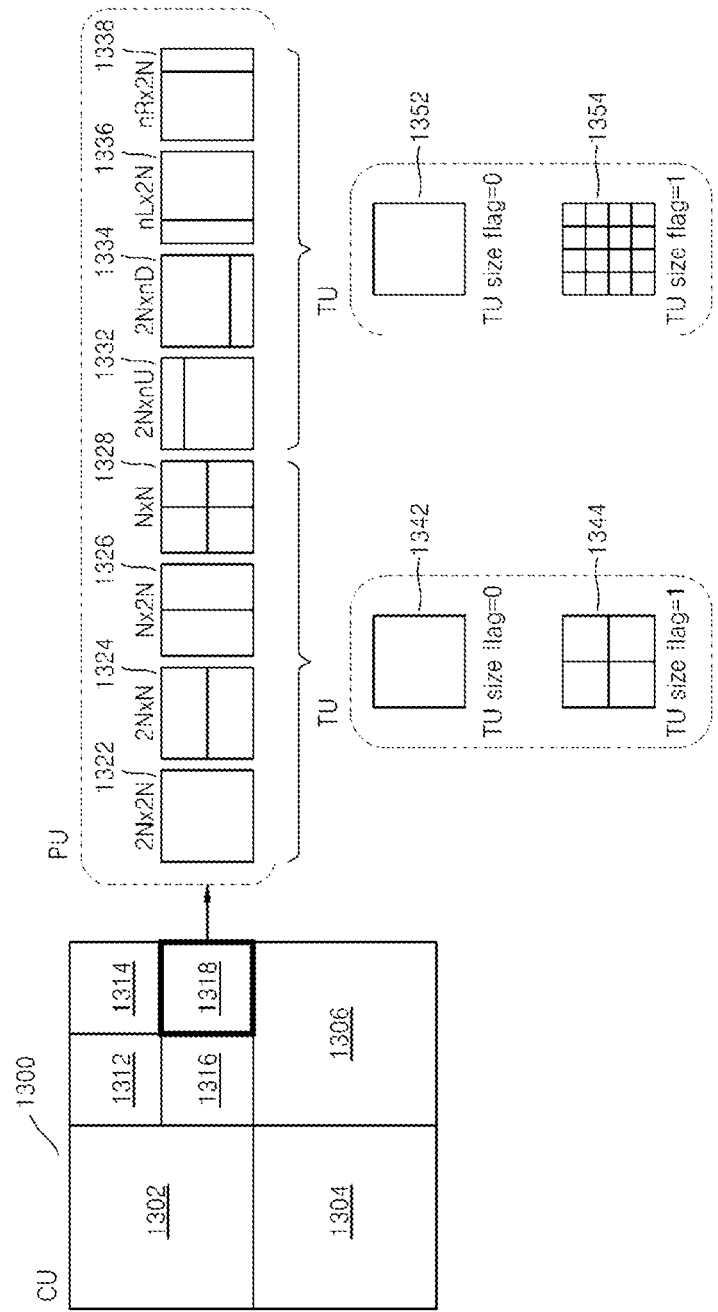
FIG. 25 is a diagram which illustrates a relationship between a coding unit, a prediction unit or a partition, and a transformation unit, according to coding mode information of Table 1.

FIG. 25 is a diagram for describing a relationship between a coding unit, a prediction unit or a partition, and a transformation unit, according to coding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a sort of a transformation index, and the size of a transformation unit corresponding to the transformation index may vary according to a prediction unit type or a partition type of a coding unit.

For example, when the partition type is set to be symmetric, i.e. the partition type 1322, 1324, 1326, or 1328, a transformation unit 1342 having a size of 2N×2N is set if a TU size flag is 0, and a transformation unit 1344 having a size of N×N is set if a TU size flag is 1.

When the partition type is set to be asymmetric, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 21, the TU size flag is a flag having a value or 0 or 1, but the TU size flag is not limited to 1 bit, and a transformation unit may be hierarchically split having a tree structure while the TU size flag increases from 0. The TU size flag may be used as an example of a transformation index.

In this case, the size of a transformation unit that has been actually used may be expressed by using a TU size flag of a transformation unit, according to an embodiment of the present invention, together with a maximum size and minimum size of the transformation unit. According to an exemplary embodiment, the video encoding apparatus 100 is capable of encoding maximum transformation unit size information, minimum transformation unit size information, and a maximum TU size flag. The encoding result of the maximum transformation unit size information, the minimum transformation unit size information, and the maximum TU size flag may be inserted into an SPS. According to an embodiment of the present invention, the video decoding apparatus 200 may decode video by using the maximum transformation unit size information, the minimum transformation unit size information, and the maximum TU size flag.

For example, (α) if the size of a current coding unit is 64×64 and a maximum transformation unit size is 32×32, then (a-1) the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, then (b-1) the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a root transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\wedge}\text{MaxTransformSizeIndex})) \quad (1)$$

Compared to the current minimum transformation unit size 'CurrMinTuSize' that can be determined in the current coding unit, the root transformation unit size RootTuSize' may denote a maximum transformation unit size that may be selected in the system. In Equation (1), 'RootTuSize/(2^MaxTransformSizeIndex)' denotes a transformation unit size when the root transformation unit size 'RootTuSize' is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that may be determined in the current coding unit.

According to an exemplary embodiment, the root transformation unit size 'RootTuSize' may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the root transformation unit size 'RootTuSize' when the TU size flag is 0 may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the root transformation unit size 'RootTuSize' may be a smaller value from among the maximum transformation unit size and the size of the current partition unit.

However, the current maximum transformation unit size that varies according to the type of a prediction mode in a partition unit, the root transformation unit size 'RootTuSize', is just an example and the present invention is not limited thereto.

Figure 26:
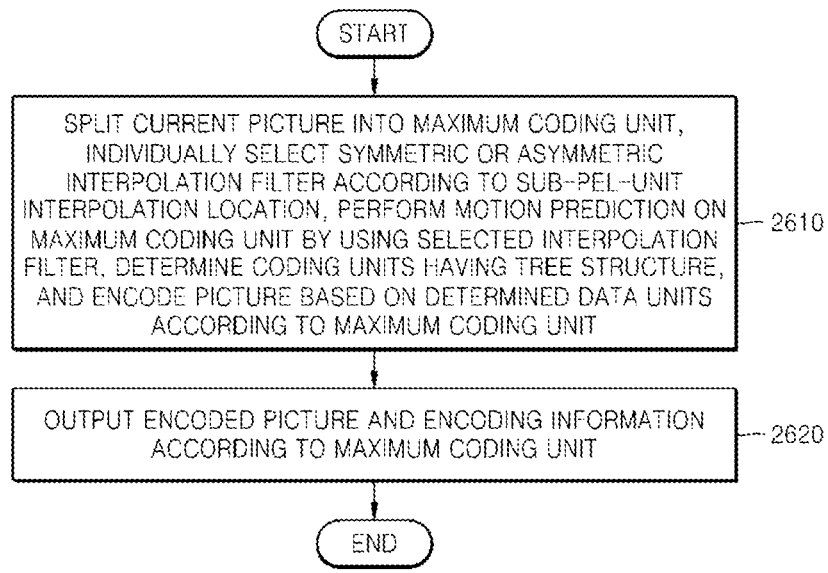
FIG. 26 is a flowchart which illustrates a video encoding method using an interpolation filter based on coding units having a tree structure, according to an exemplary embodiment.

FIG. 26 is a flowchart of a video encoding method using an interpolation filter based on coding units having a tree structure, according to an exemplary embodiment.

In operation 2610, in order to encode a current picture of an input video, the current picture is split into at least one maximum coding unit. Each of at least one split region, which is obtained by splitting a region of each maximum coding unit according to depths, may be encoded. In order to encode each split region according to depths, transformation and quantization are performed on an inter prediction result based on sub-pel-unit interpolation, and intra prediction.

Here, a split depth for outputting a final encoding result according to the at least one split region may be determined by comparing results of encoding split regions according to depths, and coding units included in a current maximum coding unit and having a tree structure may be determined. Like the coding units having a tree structure, transformation units having a tree structure may be determined. In other words, as an encoding result of a picture, like the determined coding units having a tree structure, an encoding result of the transformation units having a tree structure may be output as encoded data of the picture.

Inter prediction may be performed on each prediction unit or partition of the coding unit. Motion of a current prediction unit or partition may be predicted with reference to pixels generated by performing sub-pel-unit interpolation. From among interpolation filters for generating a sub-pel-unit pixel value, an interpolation filter is differently selected based on a sub-pel-unit interpolation location. In order to efficiently perform image interpolation, interpolation filter coefficients may be selectively determined. The interpolation filter may be selected as a symmetric or asymmetric interpolation filter according to an interpolation location. The interpolation filter may be an odd- or even-number-tap interpolation filter.

From among interpolation filter coefficients previously stored in memory, a desired interpolation filter may be selected according to a sub-pel-unit interpolation location, a smoothness, the number of filter taps, a bit depth, a scaling ratio, a basis function of interpolation filtering based on transformation, a window filter size, and a color component, and interpolation may be performed to generate the sub-pel-unit pixel value.

In operation 2620, image data obtained as the final encoding result according to the at least one split region of each maximum coding unit, and information about the coded depth and the coding mode are output as a bitstream.

The information about the coding mode may include information about the coded depth or split information, information about a partition type of a prediction unit, information about a prediction mode, and information about a tree structure of transformation units. The encoding information may include information about an interpolation filter used to perform sub-pel-unit prediction encoding. The encoded information about the coding mode may be transmitted to a decoding apparatus together with the encoded image data.

Figure 27:
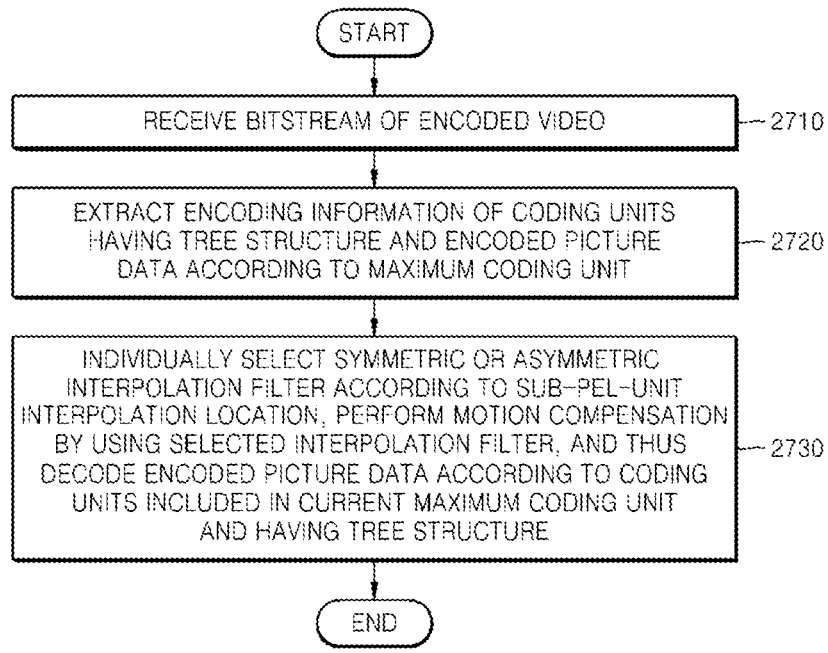
FIG. 27 is a flowchart which illustrates a video decoding method using an interpolation filter based on coding units having a tree structure, according to an exemplary embodiment.

FIG. 27 is a flowchart of a video decoding method using an interpolation filter based on coding units having a tree structure, according to an exemplary embodiment.

In operation 2710, a bitstream of an encoded video is received and parsed.

In operation 2720, encoded image data of a current picture assigned to a maximum coding unit, and information about a coded depth and a coding mode according to maximum coding units are extracted from the parsed bitstream. Information about an interpolation filter required to perform sub-pel-unit motion compensation may be extracted from the encoding information.

Information about the coded depth and the coding mode may be extracted from the encoding information. According to the information about the coded depth and the coding mode, a maximum coding unit may be split into coding units having a tree structure. Also, according to information about a tree structure of transformation units included in the extracted information, transformation units having a tree structure according to transformation depths in the coding units may be determined.

In operation 2730, by using the information about the coded depth and the coding mode according to each maximum coding unit, image data of each maximum coding unit may be decoded based on the coding units having a tree structure, prediction units, and the transformation units having a tree structure. Since a current coding unit is decoded based on the information about the coded depth and the coding mode, a current coding unit may be inversely transformed by using a transformation unit determined from among the transformation units having a tree structure.

Encoded picture data may be decoded by performing various decoding operations such as motion compensation and intra prediction on each prediction unit or partition of the coding unit based on the coding mode.

Specifically, if encoded residual data and reference data are extracted based on pixels interpolated in a sub-pel unit, motion compensation on a current prediction unit or a current partition may be performed based on the pixels interpolated in sub-pel units. From among interpolation filters for generating a sub-pel-unit pixel value, an interpolation filter may be differently selected based on a sub-pel-unit interpolation location. The interpolation filter may be selected as a symmetric or asymmetric interpolation filter according to an interpolation location. The interpolation filter may be an odd- or even-number-tap interpolation filter.

In order to efficiently perform image interpolation, interpolation filter coefficients may be selectively determined. From among interpolation filter coefficients previously stored in memory, a desired interpolation filter may be selected according to a sub-pel-unit interpolation location, a smoothness, the number of filter taps, a bit depth, a scaling ratio, a basis function of interpolation filtering based on transformation, a window filter size, and a color component, and interpolation may be performed to generate the sub-pel-unit pixel value.

A reference picture and a reference region are determined by using the reference data, and the sub-pel-unit pixel value may be generated by performing interpolation filtering on two or more integer-pel-unit reference pixels of the reference picture. Motion compensation may be performed on the current prediction unit or the current partition by combining the generated sub-pel-unit pixel value and the residual data, and thus prediction decoding may be performed.

Because each maximum coding unit is decoded, image data in a spatial domain may be restored, and a picture and a video that includes a picture sequence may be restored. The restored video may be reproduced by a reproduction apparatus, may be stored in a storage medium, or may be transmitted in a network.

The exemplary embodiments may be written as computer programs and may be implemented in general-use digital computers that execute the programs using a transitory or non-transitory computer readable recording medium. Examples of the non-transitory computer readable recording medium include magnetic storage media (e.g., ROM, floppy disks, hard disks, etc.) and optical recording media (e.g., CD-ROMs, or DVDs).

While the present inventive concept has been particularly shown and described with reference to exemplary embodiments thereof, it will be understood by those of ordinary skill in the art that various changes in form and details may be made therein without departing from the spirit and scope of the present inventive concept as defined by the appended claims. The exemplary embodiments should be considered in a descriptive sense only and not for purposes of limitation. Therefore, the scope of the present inventive concept is defined not by the detailed description but by the appended claims, and all differences within the scope will be construed as being included in the present inventive concept.

What is claimed is:

1. A method of motion compensation, the method comprising:
   determining, in a luma reference picture, a luma reference block for prediction of a current block, by using a luma motion vector of the current block;
   generating a luma sample of a ¼-pixel location or a ¾-pixel location included in the luma reference block by applying a 7-tap filter to luma samples of an integer pixel location of the luma reference picture;
   determining, in a chroma reference picture, a chroma reference block for prediction of a current block, by using a chroma motion vector of the current block; and
   generating a chroma sample of a ⅛-pixel location or a ⅘-pixel location included in the chroma reference block by applying a 4-tap filter to chroma samples of an integer pixel location of the chroma reference picture,
   wherein the 7-tap filter comprises seven filter coefficients, the 4-tap filter comprises four filter coefficients, and
   filter coefficients of the 4-tap filter for generating the chroma pixel of the ⅛-pixel location is arranged in reverse order against filter coefficients of the 4-tap filter for generating the chroma pixel of ⅞-pixel location.

2. The method of claim 1, wherein the generating of the luma sample comprises: scaling the luma sample generated by applying the 7-tap filter by using a luma scaling factor so that a sum of coefficients of the 7-tap filter is 1.

3. The method of claim 1, wherein the generating of the at least one chroma sample comprises: scaling the chroma sample generated by applying the 4-tap filter by using a chroma scaling factor so that a sum of coefficients of the 4-tap filter is 1.

* * * * *